United States Patent
Ekanadham et al.

(10) Patent No.: US 9,400,700 B2
(45) Date of Patent: *Jul. 26, 2016

(54) OPTIMIZED SYSTEM FOR ANALYTICS (GRAPHS AND SPARSE MATRICES) OPERATIONS

(71) Applicant: International Business Machines Corporation, Armonk, NY (US)

(72) Inventors: Kattamuri Ekanadham, Mohegan Lake, NY (US); William Pettit Horn, Scarsdale, NY (US); Joefon Jann, Ossining, NY (US); Manoj Kumar, Yorktown Heights, NY (US); Jose Eduardo Moreira, Irvington, NY (US); Pratap Chandra Pattnaik, Ossining, NY (US); Mauricio Jose Serrano, Bronx, NY (US); Ilie Gabriel Tanase, Somers, NY (US); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,362

(22) Filed: Jun. 24, 2015

(65) Prior Publication Data

US 2016/0188385 A1 Jun. 30, 2016

Related U.S. Application Data

(63) Continuation of application No. 14/588,333, filed on Dec. 31, 2014, now Pat. No. 9,304,835.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)
*G06F 17/30* (2006.01)

(52) U.S. Cl.
CPC .......... *G06F 9/541* (2013.01); *G06F 17/30958* (2013.01)

(58) Field of Classification Search
None
See application file for complete search history.

(56) References Cited

U.S. PATENT DOCUMENTS

| | | |
|---|---|---|
| 2002/0054166 A1 | 5/2002 | Decombe |
| 2004/0111469 A1 | 6/2004 | Manion et al. |
| 2004/0139067 A1 | 7/2004 | Houle |
| 2008/0270331 A1 | 10/2008 | Taylor et al. |

OTHER PUBLICATIONS

United States Notice of Allowance dated Dec. 7, 2015, in U.S. Appl. No. 14/588,333.

*Primary Examiner* — Craig Dorais
(74) *Attorney, Agent, or Firm* — Preston J. Young, Esq.; McGinn IP Law Group, PLLC

(57) ABSTRACT

A graph processing system includes a graph API (Application Program Interface), as executed on a processor of a computer and as capable of implementing any of a plurality of graph operators to express computations of input graph analytics applications. A run-time system, executed by the processor, implements graph operators specified by each graph API function and deploys the implemented graph operators to a selected computing system. A library contains multiple implementations for each graph API function, each implementation predetermined as being optimal for a specific set of conditions met by a graph being processed, for functional capabilities of a specific computing system on which the graph is being processed, and for resources available on that specific computing system.

9 Claims, 16 Drawing Sheets

FIG. 11
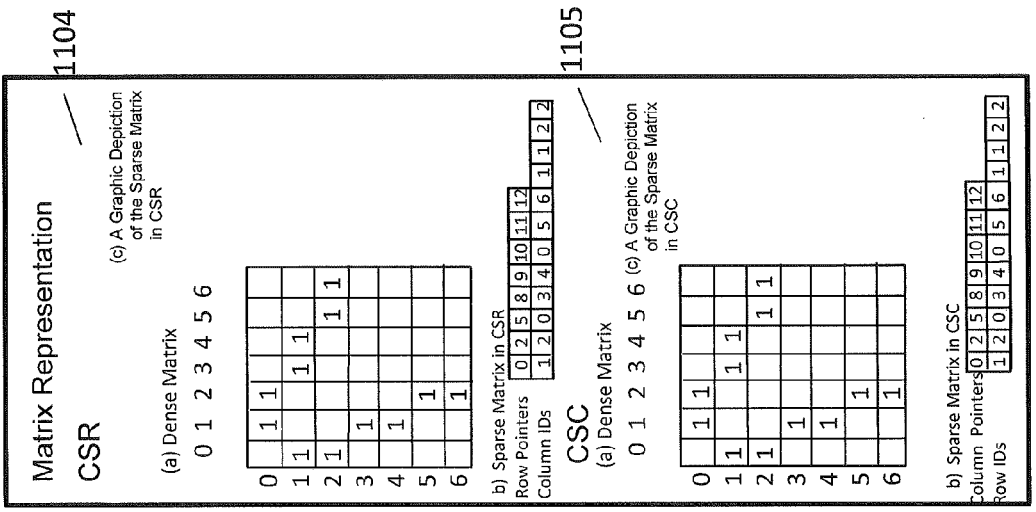
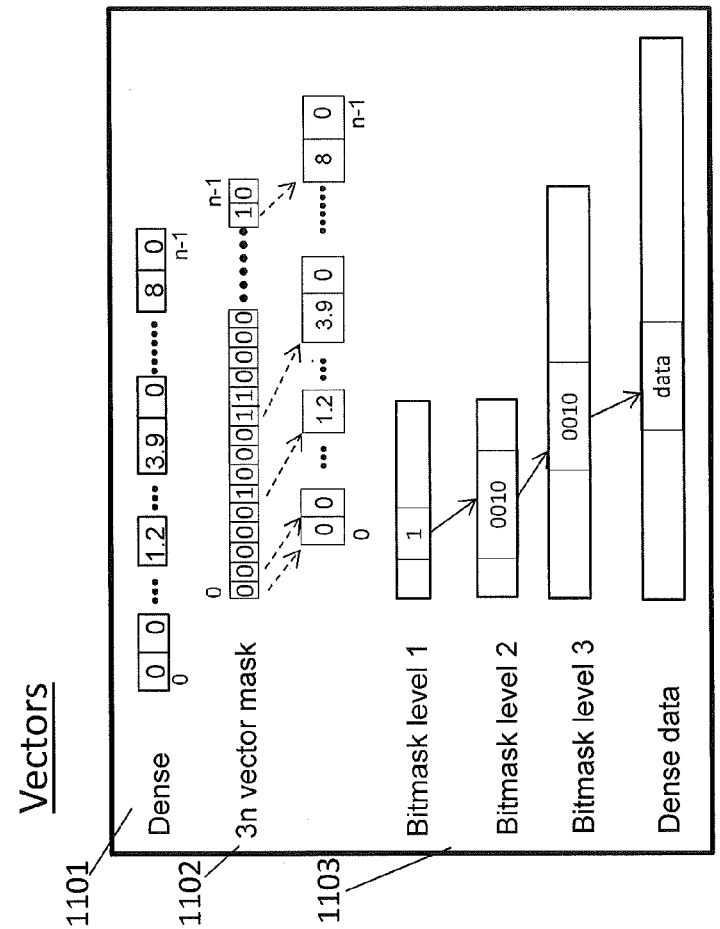

Code for V x M (with matrix in CSR form)
for (j = 0; j < n; j++)
  qj = q[j];      // n loads
  if (q[j])       // n compares
    for (k = M, row [j];
        k < M, row [j + 1];
        k++)    // 2n(1-sp(V)) loads
      i = M, adj[k];  // nd(1-sp(V)) loads
      r[i] = r[i] + qj;  // 3nd (1-sp(V))
            // load + add + store //total: $n(2+(2+4d)(1-sp(V)))$

1202

Code for V x M (with matrix in CSC form)
for (i=0; i<n; i++)
  ri = 0;
  for (k=M.col[i];
      k<M.col[i+1];
      k++)    // 2n loads
    j = M.csc[k];  // nd loads
    ri = ri + q[j];  // $2^{nd}$ (load + add)
  r[i] = ri;       // n stores
//total: $n(3+3d)$

```
Code to do fused operation, with M in CSC form
That is, do: t = q*M; r = filter(p,t); together
for (j=0;j<n; j++)
  rj=0;
  if (p[j] ==/= 0) continue;  // 2n load + compare
  for (k = M.col[j];
       k < M.col[j+1];
       k++)
    i = M.csc[k];                // 2n * sp(p) loads
    rj = rj + q[i];              // nd * sp(p) load + add
  add                            // 2nd * sp(p) load +
  r[j] = rj;                     // n stores
return r
//total: n(3+(2 + 3d) * sp(p))
```

1301

```
Code for r = filter (p,t)
for (j = 0; j < n; j++)
  if (p[j] = 0)      // 2n (load + compare ) of p[j]
    then r[j] = t[j]  //n * sp(p) loads of t[j]
    else r[j] = 0    //n stores of r[j]
//total: n(3 + sp(p))
```

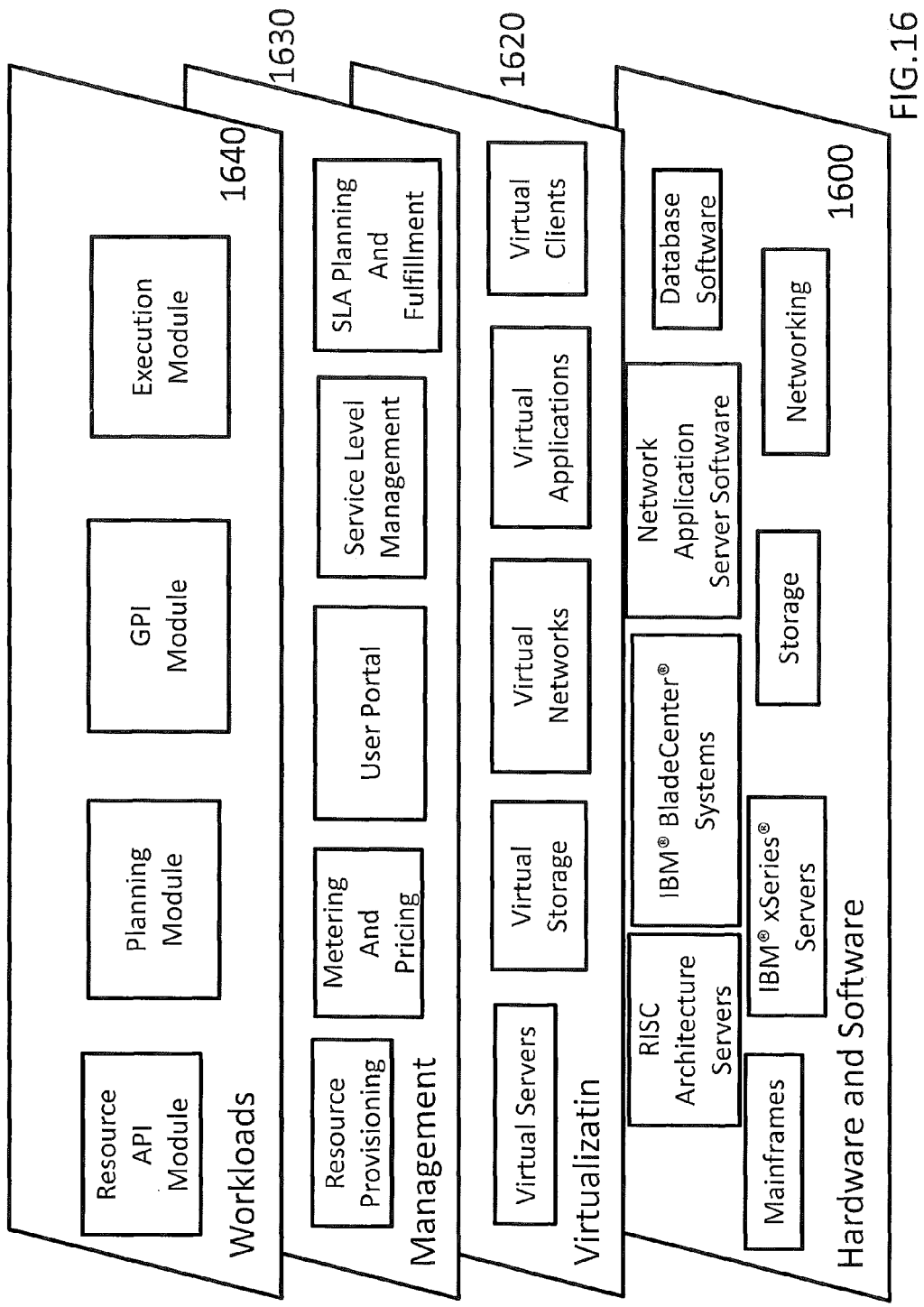

OPTIMIZED SYSTEM FOR ANALYTICS (GRAPHS AND SPARSE MATRICES) OPERATIONS

The present application is a Continuation Application of U.S. patent application Ser. No. 14/588,333, filed on Dec. 31, 2014.

BACKGROUND

The present invention relates to increasing processing efficiency, and more specifically, to optimization and implementation of graph analytics applications as based on providing a graph analytics run time that provides a platform that for automatically determining an optimal implementation, for a graph API (Application Program Interface) operator called from a developer's graph analytics application by comparing operating time costs for various alternative processing scenarios including such differences as different graph representation formats, operators, and machine configurations.

Graph analytics is an important component of cognitive computing. For example, much of big data information, a subject commanding great attention these days, is graph structured. The analysis requires large graphs to be subgraphed, analogous to select and project operations in SQL (Structured Query Language), and then to be analyzed for various properties.

For example, as shown in FIG. 1, filters 101 can be used to construct graphs related to incoming or stored data. There might be, for example, incoming data to that is stored as a graph 102 that includes a node identifying a specific individual or event and other nodes store additional incoming data related to that individual or event. When this data is analyzed using a graph analytics program 103 the graphs are iteratively broken down 104 into subgraphs and other objects of interest. However, since the graph data is typically stored in memory as graph nodes linked to other nodes in a random order, processing of the graph data in the graph analytics program can be quite lengthy because of the time needed to access the graph data stored in such linked random access order.

The efficiency of processing graph data depends on not only efficiency of the software operators used in the processing, but also computer architecture features as cache sizes, etc. Since the graph analysis requires sizable computational resources, often graph analysis based application developers are faced with the task of optimizing their application and selecting the hardware system to execute the applications efficiently. Potential systems one might consider include, for example, large SMPs (Symmetric MultiProcessors) that are multi-core/multi-threaded general purpose processors based systems, distributed memory systems, and accelerated systems where the CPUs (Central Processing Units) are augmented with GPUs (Graphics Processor Units) and FPGAs (Field Programmable Gate Arrays). Traditionally, to achieve good performance, each of these systems requires the basic operators of the graph algorithm to be coded differently.

Thus, as shown exemplarily in FIG. 1, an applications developer attempting to utilize graph analytics processing would have to consider application metadata 106, representation format 107 of the graph data, and details of operator execution 108. Additionally, the developer would have to consider system metadata 109 for the computing system 110 that is intended to be used to perform the graph analytics program 103.

Developers often have to rewrite programs for each system and for each anticipated metadata of the application metadata 106 and the system metadata 109 to include system specific optimization and graph characteristics. These characteristics of non-compatibility make it difficult for application developers to optimize graph analytics program processing for all dynamic situations, and there is no portability or reuse of code.

Thus, two key challenges faced by developers of large graph analytics are: 1) programming for optimum performance, which requires significant effort; and 2) portability, while maintaining performance, as the chosen system evolves over time or if the user wishes to move from one type of system to another. These challenges arise because attaining optimum performance requires detailed knowledge of the design of the processors and the systems they comprise, including their cache/memory hierarchy. This knowledge is needed to adapt the analytics algorithms to the underlying system, in particular to take advantage of the parallelism or concurrency at the chip, node or system level. Exploiting concurrency/parallelism so far has been a skilled and non-automated task.

The performance and portability challenges are not easily addressable by compilers because compilers do not have ability to examine large instruction windows, and in the conventional representation of the graph algorithms, the control flow is often data dependent. Particularly, such factors as the number of nodes and edges in the graph being analyzed, the sparsity of the graph data, and whether or not the sparse entries have a regular pattern are not known to the compiler.

In recognizing that developers implementing graphic analysis are often faced with the task of not only selecting a hardware system to execute their applications optimally, but also the task of reworking code to accommodate each graph analysis scenario, the present inventors have also recognized that there is a need for a mechanism that provides good performance in graph analysis processing while permitting the application to be portable across platforms.

SUMMARY

According to an embodiment of the present invention, a run-time system serves as a platform upon which application developers can interface using an API to automatically implement their specific graphic analytic applications without being concerned about changing program coding or the actual machine operations underlying the implementation of their application. This graph processing system, with its API and supporting run-time system, permits many graph algorithms to be written with ease based on a handful of abstractions and basic operators that manipulate the graph abstractions. It relieves the application programmer from any concerns about the implementation choices and optimizations.

BRIEF DESCRIPTION OF THE DRAWINGS

FIG. 11 show exemplary representations 1100 for vectors and matrices;

FIG. 12 shows code 1200 for a matrix in CSR and CSC forms;

FIG. 13 shows code 1300 for comparison of two different fusions of operations;

FIG. 16 depicts abstraction model layers according to an embodiment of the present invention.

DETAILED DESCRIPTION

Figure 1:
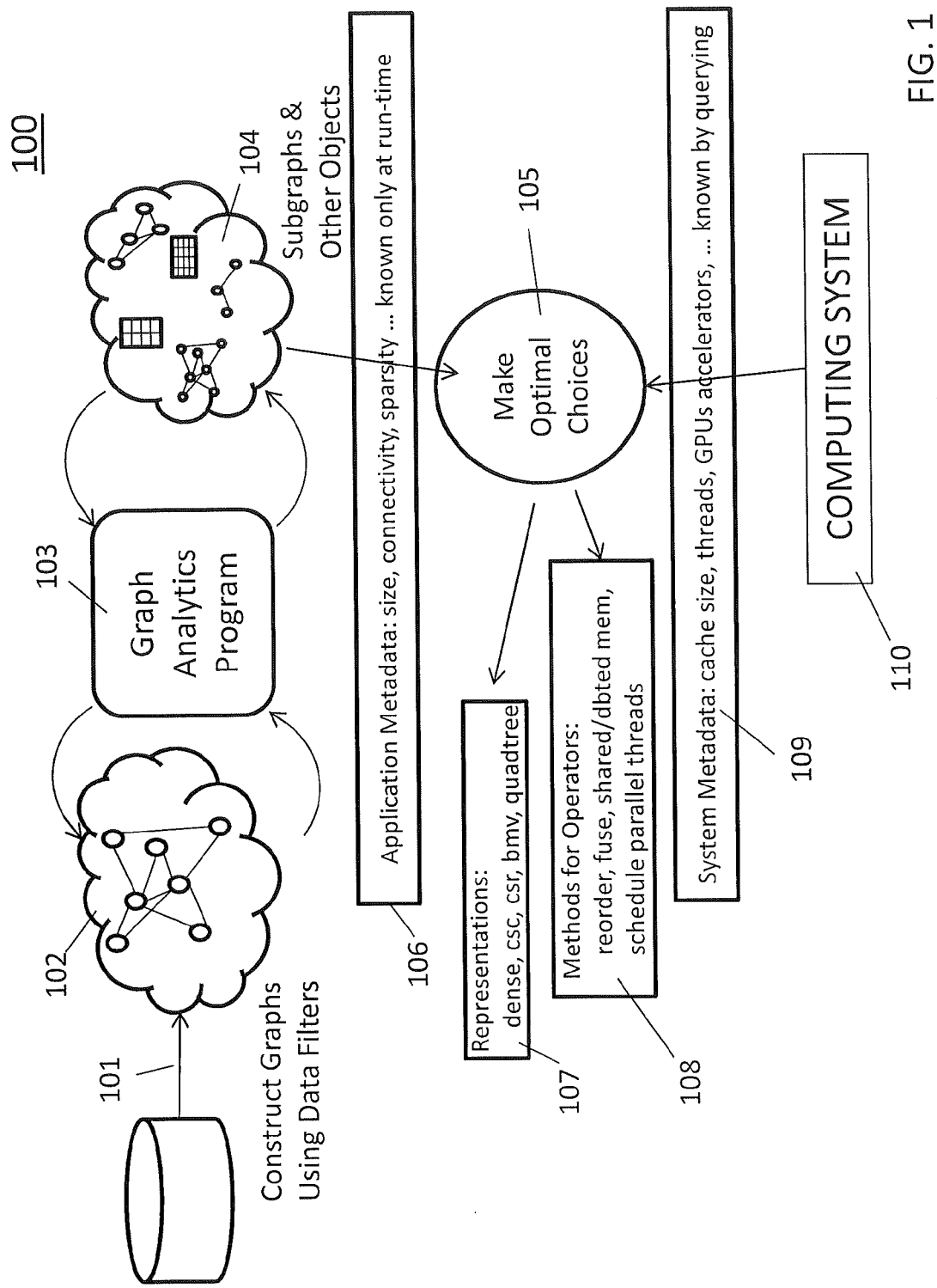
FIG. 1 exemplarily describes the problem 100 being addressed by the present invention and an overview of a conventional method used by application developers for attempting to optimize graph analytics program processing.
Figure 2:
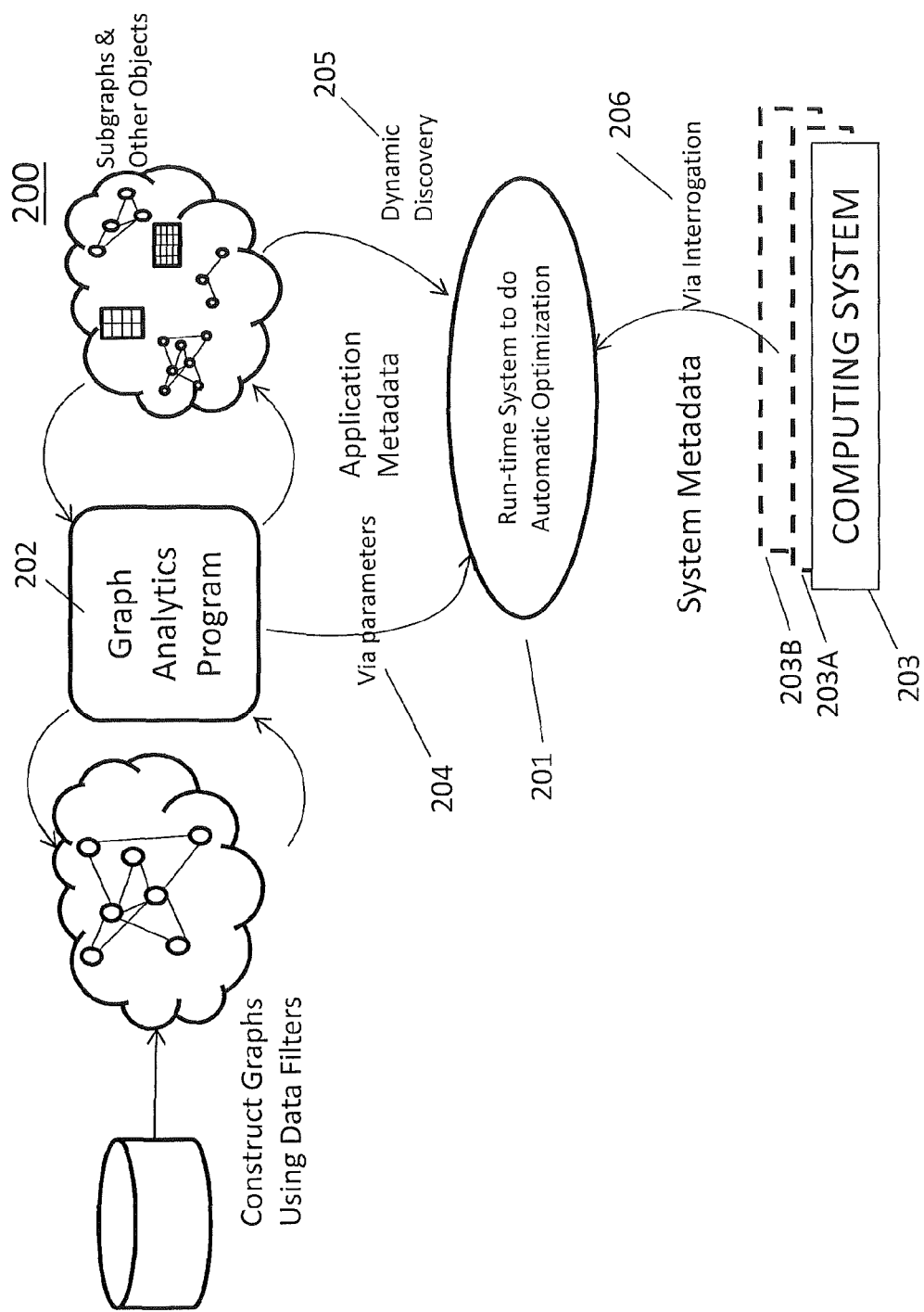
FIG. 2 exemplarily shows a high-level overview 200 of the solution described by the present invention.

With reference now to FIG. 2, the present invention provides a graph analytics run-time system 201, executing on a first computer, that automatically optimizes execution of operations on graph data, both received as an input graph analytics program 202, using a second computer 203 that has been selected by the run-time system 201 as having computation resources that are available and would be optimal for the input graph analytics program and data according to an application programmer specified criteria. The run-time system 201 and the second computer 203 selected by the run-time to execute the graph operations could also be different operating system processes running on the same computer system (hardware/OS), and typically the same computer would be preferable unless the run-time system determined that another computer (subsystem) equipped with special hardware artifacts such as GPU (Graphic Processing Unit) or FPGA (Field Programmable Gate Array) would be optimal for the selected operation.

In the context of the present invention, this graph analytics run-time system 201 is intended as referring to a software tool being executed on a platform running on top of an operating system of the first computer, which might typically be a server on a network. The software tool of the present invention executing on this platform will provide automatic optimization of the input graph analytics program/data. The actual execution of the graph analytics program 202 could occur on another computer 203 in the network that was selected by the run-time system 201 to be optimal for the specific input graph analytics program/data 202, based on the second computer's computational resources and capabilities, or, as previously mentioned, could be on the same machine that is running the graph analytics run-time system 201. The run-time system 201 will continue to be involved in the actual execution of input graph analytics program/data 202 by way of providing data conversion and oversight of the execution on selected machine 203. In selecting the second machine 203 as optimal for the execution of graph analytics program application, the run-time system 201 will have evaluated and compared computational capabilities of alternative machines 203A,203B that were available at the time of executing/running the input graph analytics program. As shown in FIG. 2, the run-time system 201 receives input parameters 204 for the intended graph analytics program 202 and makes dynamic discovery of application metadata 205. In order to make an optimal machine 203 selection, the run-time will have sent out an interrogation query to various possible alternative machines (e.g., 203, 203A, 203B) on the network, to detect their respective computational resources and configurations.

Accordingly, the present invention provides a solution that mitigates the above-mentioned limitations of the compilers while ensuring that the burdens described in the previous section are not imposed on the application developer. The application developer does not have to struggle with rewriting and tuning the applications as the graph characteristics change or as the systems undergo implementation changes.

The present invention is intended to provide a number of exemplary benefits, including the following values and capabilities:

1. Unburden and shield the application developer from performance concerns, including concerns at the hardware thread level for ordering and scheduling tasks;

2. Unburden the application developer from the task of adapting code to the sizes of the various caches and the size of main memory in the memory hierarchy;

3. Unburden the application developer from the headaches of exploiting parallelism, factoring in the design of the memory subsystem as well as the nature of compute nodes;

4. Address the porting issue by providing portability of applications across platforms; and 5. Provide automatic optimizations by such techniques as changing representations of underlying data structures to be more suitable to the graphs being analyzed, based on such factors as their size and sparsity of connections, and by deploying the execution of optimized routines that are tailored to the specific graphs being analyzed.

Section I: The Macro View of the Present Invention

Figure 3:
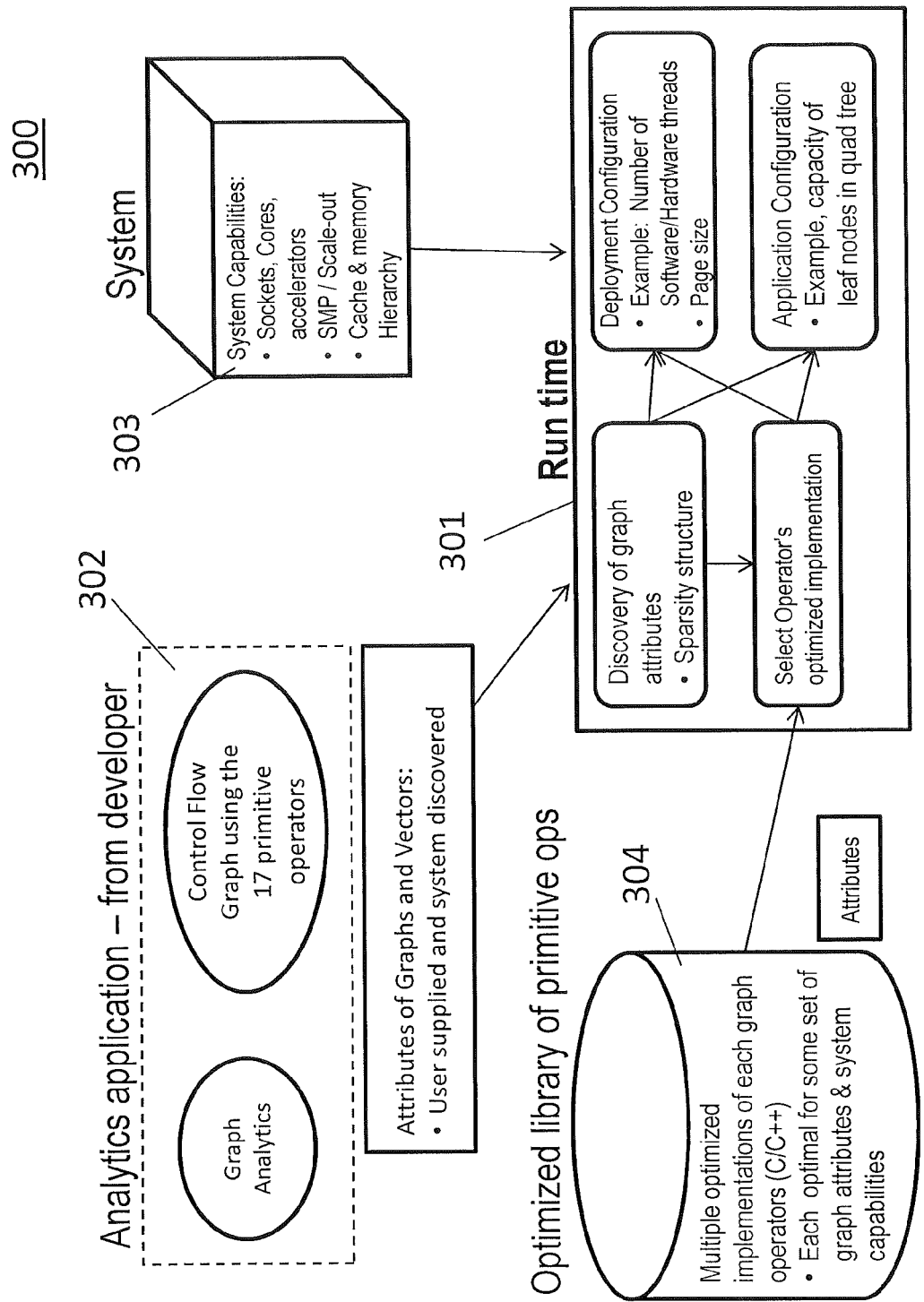
FIG. 3 shows in schematic format 300 the primary components of an exemplary embodiment of the present invention.

Turning now to FIG. 3, the run-time described herein, creates the above values and benefits by providing optimized operator implementations, based on graph and system characteristics. There are about fifteen to twenty graph operators expressed as matrix operations, and optimized for a set of commonly-used graph applications. It is noted that the optimization of these operators is not considered as an aspect of the present invention, since such optimized operators are considered herein as known in the art and available for use by developers of analytical applications. Rather, the run-time system of the present invention accesses a library of these known optimized operators, based upon the optimization processing for each input application. Various graph operators present in the initial version of the run-time system are mentioned later in this disclosure, and a complete listing of operators can be found in, for example: K. Ekanadham, et al, "Graph Programming Interface: Rationale and Specification", IBM Research Report RC25508, Nov. 19, 2014.

The run-time system of the present invention maintains a variety of methods to execute these operators and invokes the appropriate methods based on the characteristics of the operands. Once constructed, these optimized graph operators receive graph data from the input application, converted by the run-time to the format expected by the graph operator, if required, and then output the result back to the application. If necessary, the run-time will then map the result produced by the operator back to the format expected by the application. These operator implementations are selected by the run-time system based on three kinds of input information. The first input is metadata for the properties of the graph data, which contains information such as the size of the graph and nature of its sparsity. The second input is information for the attributes of the system the operator implementation will run on, such as the size of the main memory and cache hierarchies, SMT (Simultaneous MultiThreading) levels of cores, and availability of hardware accelerators such as FPGAs and GPUs. The third and final input is data for cost functions that give an estimation of the time required to perform the graph operator operation using a specified implementation for the graph operators on a specified set of input arguments and system settings. FIG. 3 shows a schematic diagram 300 that illustrates the run-time 301 in the context of the graph analytics application 302, the system 303 on which the application will be executed, and the library 304 of optimized implementations for the GPI (Graphic Processing Interface) functions. In the context of the present invention, a GPI is the specification of the set of functions that can be invoked by the application programs, including their arguments and semantics. Thus, the API will implement specific GPIs during execution as based on the operator and selected system, meaning that a GPI is a graph API. Along this line, a GPU (Graphics Processing Unit) is a hardware capability attached to some conventional computing configurations to accelerate execution of certain operators. Although FIG. 3 shows exemplarily only one single system 303 for executing the analytics application 302, as previously described relative to FIG. 2, the runtime 301 of the present invention is capable of dynamically discovering capabilities of alternative systems potentially capable of executing an analytics application 302 and determining which of the alternate systems would be optimal for any given analytical application, including determination of which settings and components should be configured on the selected system. Thus, FIG. 3 shows the system 303 that was determined by the run time 301 as optimal for the specific analytics application 302.

Figure 4:
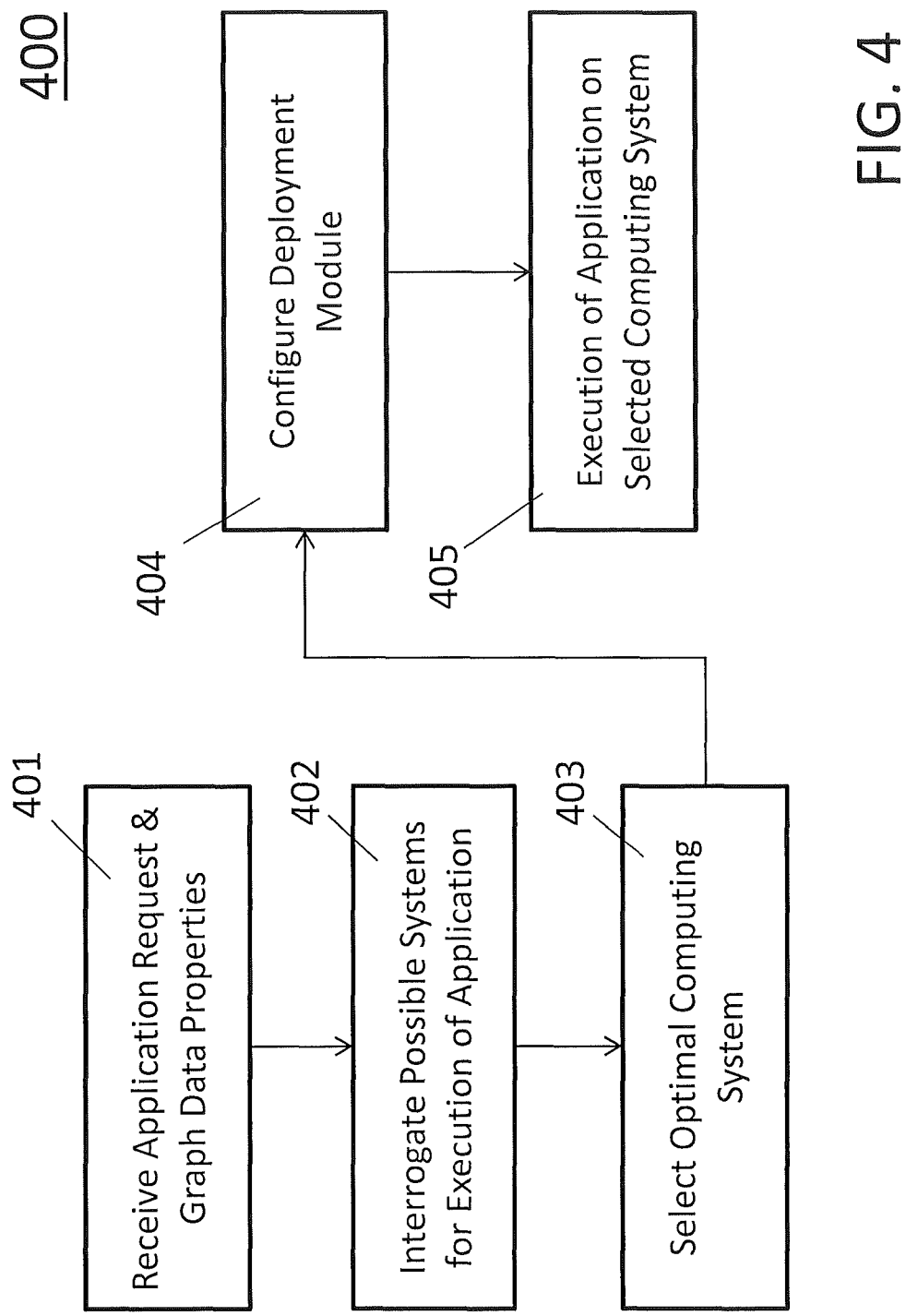
FIG. 4 shows a flowchart 400 of a high-level sequence of the present invention.

FIG. 4 shows in flowchart format 400 the primary, high-level steps involved in the present invention. In step 401, the application request and properties of the graph data are retrieved, and, in step 402, the attributes are retrieved for alternative systems that might be used to execute the analytics application. In step 403, the run-time selects the optimal system to perform the application execution, a determination that considers time costs for using the different possible alternative systems, including time costs for any format conversions. In step 404, the configuration with the lowest time cost is selected and, in step 405, the selected configuration system is engaged to execute the application, using data transmitted from the deployment module of the run-time system.

In an initial implementation of the present invention, a base set of operators has been provided, along with a starter set of systems for which each operator has an optimized implementation. This initial operator implementation set will evolve over time as new systems are added and new algorithms are covered. As noted previously, the operator optimization is known in the art and is not considered an aspect of the present invention.

Figure 5:
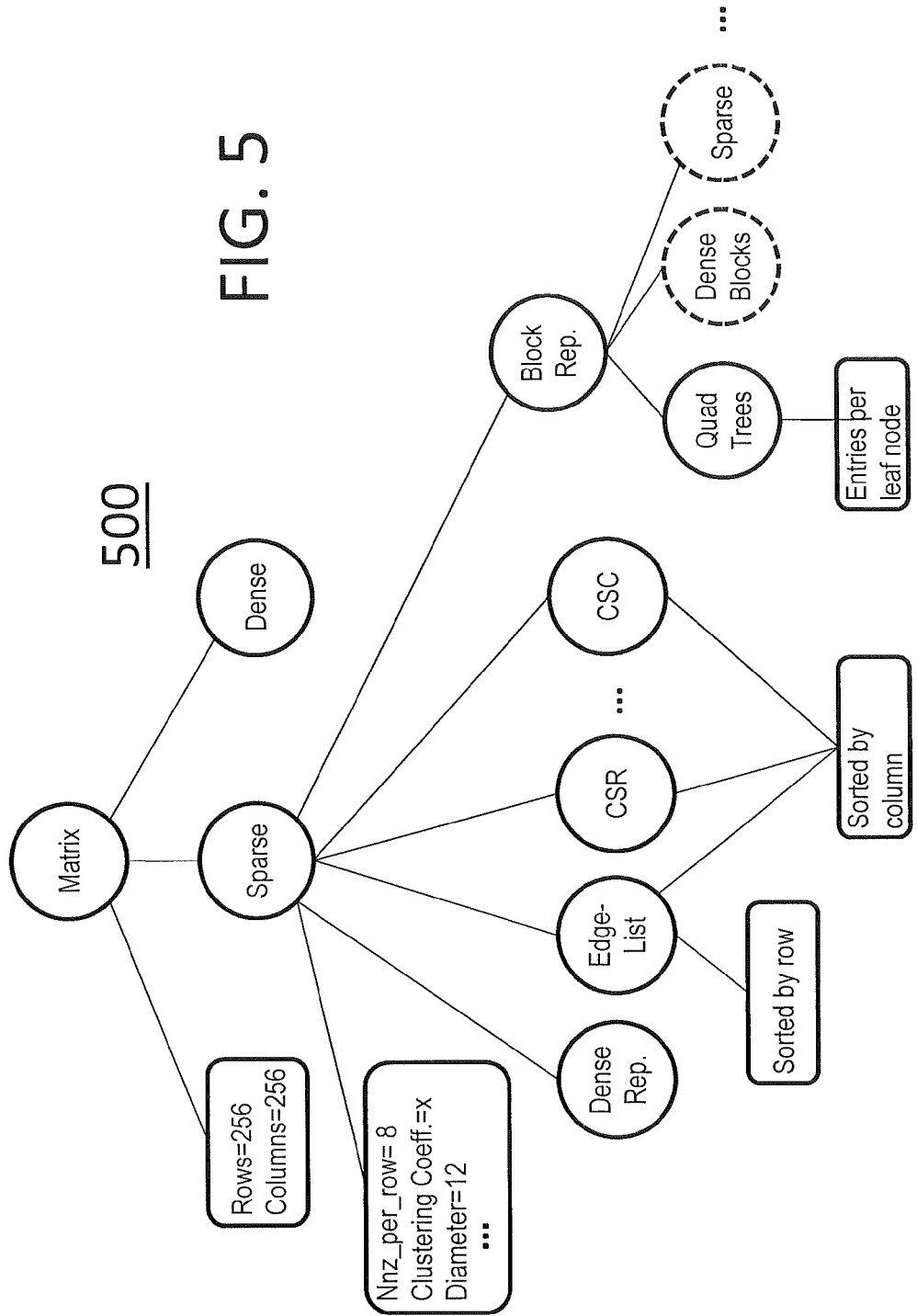
FIG. 5 shows exemplary metadata 500 associated with matrix arguments passed to the GPI described in an exemplary embodiment of the present invention.

There are four key elements of a GPI run-time of an exemplary embodiment of the present invention such as shown in FIG. 3. First, there is metadata associated with the arguments passed as actual parameters in a GPI function call. FIG. 5 provides examples 500 of such metadata arguments that could characterize the matrix format of the graph data to be provided as input into the application. These alternative graph data formats are well known in the art. Although FIG. 5 shows exemplary matrix representations, there are also alternative representations for vectors, such as dense, linked-list, segmented lists, etc., which are also well known in the art. It is noted that new data structures and new representations are expected to be added in the future as new inventions are made.

Second is metadata associated with the optimized implementations of each GPI function. Third is cost functions and methodology to select the implementation of a GPI function with minimum predicted execution time for the supplied actual parameters (function arguments) and system settings. Fourth is a methodology to configure the selected implementation for optimal performance. Each of these elements will now be discussed in further detail.

Figure 6:
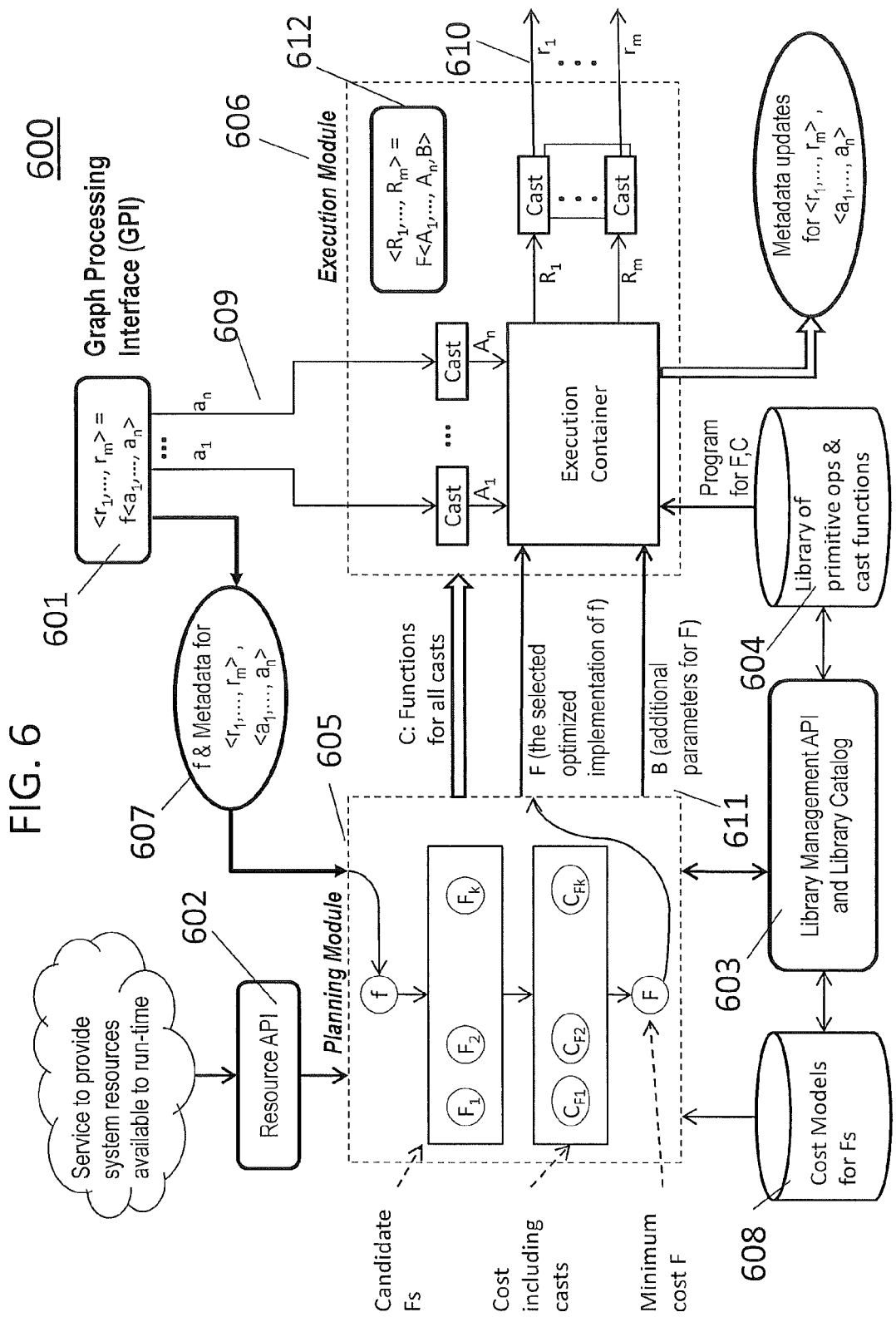
FIG. 6 shows a deployment 600 as exemplarily executing a matrix multiply operation.

As exemplarily illustrated in FIG. 6, the run-time has four main programming interfaces as rectangles with rounded corners:

1. API (Application Programming Interface) 601, for graph functions—these are the fifteen or so matrix/graph functions called from the application.

2. Resource API 602, for obtaining the functional capabilities of the system and the resource levels. Functional capabilities are availability of specific hardware such as GPUs, FPGAs, Flash memory, etc. Examples of resource level are the sizes of the functional capabilities such as the number of FPGAs/GPUs, or number of threads and cores, or the sizes of caches, and memory.

3. The Library API 603, for obtaining:

a. Available optimized implementations of Graph API functions for the available functional capabilities, resource levels, and representation/attributes of the arguments;

b. Type-casting functions to change the representation of the arguments of Graph API functions to match with optimized implementations;

c. Analyze functions to determine the attribute values of the arguments of Graph API, when needed and not available from the metadata associated with the arguments;

d. Cost models for determining the execution time of the different implementations of a Graph API functions compliant to available functional capabilities, resource levels and representation/attribute of arguments. They provide arguments to the implementation of the Graph API functions in addition to those supplied by the Graph API functions; these additional arguments are provided by the cost model. An example of such additional argument is the block size for blocked multiplication of a dense matrix, where the block size will depend on the size of the caches in the system; and 4. Programming interface for implementation of the matrix functions. The implementations are both system specific and specific to attributes of the arguments passed to the graph/matrix functions. This programming interface shows up on FIG. 6 as embedded in module 612 inside the execution module 606, as well as being embedded in the library module 603. Although the development of optimal graph operators is not considered to be an aspect of the present invention, since a number of such optimal operators have already been developed and stored in the library supporting the present invention, developers of such optimal graph operators will write to this programming interface in the present invention.

The deployment module 600 of the run-time, as shown exemplarily in FIG. 6, includes a planning module 605 and execution module 606. When the input application is being executed by the selected system, the deployment planning module 605 receives the graph operator f and associated metadata 607 for specific operations being executed. The planning module determines and selects an optimal operator implementation F to perform this operation, as based on evaluating time costs of various possible alternative functions from cost models 608, including time costs for format conversions (e.g., casts). The execution module 606 will receive actual graph data a, 609, additional parameters $b_i$ 611 needed by operator implementation F provided by the cost module, and execute any appropriate casting functions for the arguments and invokes the selected optimized methods for the graph function F. If necessary, and then send the cast formatted data $r_i$ 610 to the selected system for execution of the graphics data, using the selected function F. If necessary, the execution module 606 invokes appropriate type-casting functions to obtain the results in the desired format and then finally returns the results 610 to the selected system for execution of the graphics data, using the selected function F. The additional parameters $b_i$ 611, for example, the block size for blocked implementation of sparse matrix operations, are now no longer the concern of the application developer, since the run-time of the present invention now supplies these additional parameters $b_i$. It is noted that the programming interface described in item 4 above shows up in FIG. 6 as part of the library management API 603 and as label 612 in the execution module 606. Additional details of the operations of the planning module 605 and execution module 606, as shown exemplarily in FIG. 6 will be provided following a discussion of FIG. 7.

Figure 7:
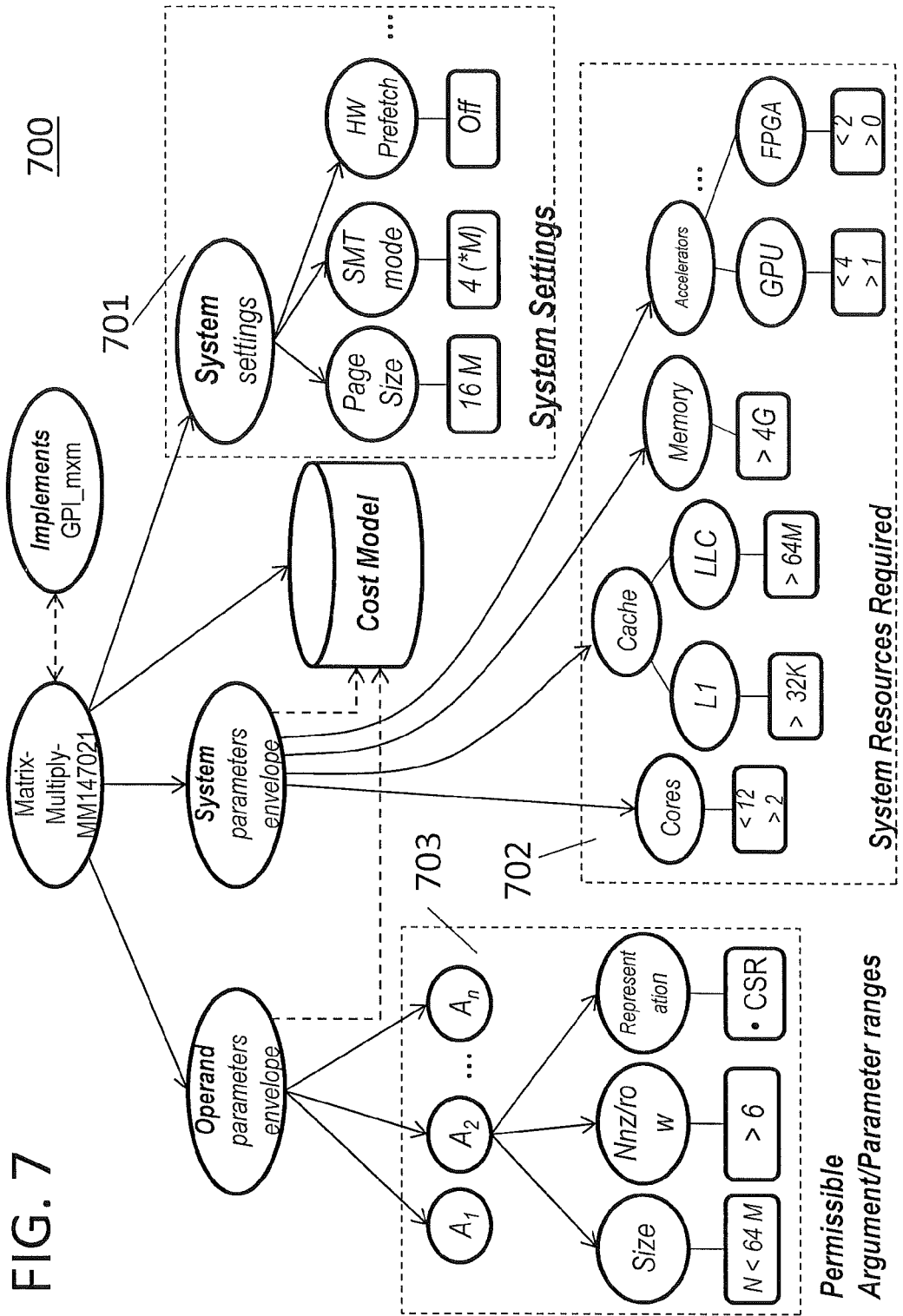
FIG. 7 exemplarily shows key parameters 700 involved in the exemplary matrix multiply operation.

Metadata Associated with Arguments Passed as Actual Parameters in a GPI Function Call We now turn to a specific example of a specific operator GPI_mxm(C,A,B,g,h), as exemplarily illustrated in FIG. 7. Per the GPI (Graph Processing Interface) API specification, the function GPI_mxm multiplies two matrices A and B to create the matrix C. Matrices form a semi-ring under proper add (map) and multiply (reduce) operators. The reduce operator in this function call is g and the map operator is h.

To explain a bit more, semi-rings require two operators. Complex, real, and integer matrices form a semi-ring under the corresponding add and multiply operations. Similarly, Boolean matrices form a semi-ring under Boolean AND and Boolean OR operations. There can be matrices of other types or choice of operations which form a semi-ring. In a map/reduce programming model used for large data sets processed on a cluster of computing nodes, the map function encompasses the multiply operator and the reduce function encompasses the add operator.

When a GPI function/primitive is called from an analytics application, metadata is associated with each argument passed and each result returned. FIG. 5 illustrates exemplarily the taxonomy 500 for the metadata for the matrices. This metadata is created as a combination of inputs from the application and of discovery in the runtime. Metadata entries can be incomplete and the runtime will discover them as needed, but if the application provides that information, the run-time can eliminate some redundant work involved in the process of completing the matrices' metadata.

In the present example, it will be assumed that matrix A is passed as an edge list with few to few-tens of non-zero entries per row on average and that B is a matrix of similar sparsity passed as a dense representation. This assumption rests on empirical observations on matrices encountered in real world social media and other big data applications. While the average sparsity is a few tens or fewer entries per row, these matrices follow power law distribution for the number of entries per row, i.e., some rows will have very large numbers of entries.

The graph analytics run-time has several implementations of each GPI function and, accordingly, several implementations of GPI_mxm(C,A,B,g,h), one of which as an example might be Matrix-Multiply-MM47, as illustrated in FIG. 7.

Some implementations can be extensions of other implementations, instrumented to capture the performance of the implementation. In addition to the implementations of the GPI primitives/functions, the library (e.g., 604 in FIG. 6) also contains two classes of functions, namely the 'type-casting' functions and 'analyze' functions. The 'type-casting' functions transform or type-cast the argument being received in the GPI graph analytics operator call into the representation required by the optimized implementation of that function call. Analogously, they transform the results produced by the implementation of the GPI function into a representation specified in the metadata for the results in the graph analytics operator call.

In our example, it is assumed that the implementation Matrix-Multiply-MM47 requires the A and B matrices to be in CSR (Compressed Sparse Row) format. Conversion of A from edge list to CSR format and the conversion of and the conversion of B from dense to CSR representation will be carried out by the 'type-casting' functions in the library.

The 'analyze' functions compute the attribute values missing in the metadata of the arguments passed in the GPI function calls. The metadata is shared information between the application and the run-time and either side can update it. The attributes values computed by the run-time 'can be' saved in the metadata associated with the arguments of the GPI functions. In the working example used in this discussion, the Matrix-Multiply-MM47 implementation of GPI_mxm(C,A,B,g,h) is assumed to require that the sparsity value of the two argument matrices to be known. If this information is not present in the metadata, the run-time not only can compute it, provided the proper 'analyze' function was provided, the run-time can also update the metadata for A and B for future use. If this 'analyze' function is not available in the library, then Matrix-Multiply-MM47 could not be considered as a candidate implementation for GPI_mxm(C,A,B,g,h) for this exemplary input matrix data.

Metadata Associated with Implementations of GPI Functions and Ascertaining Implementations Applicable to a GPI Function Call In order to evaluate the applicability of an optimized implementation of a GPI graph analytics operator to a GPI graph analytics operator call, as well as its performance, each implementation of a GPI function also has metadata attached to it and has three key parts:

1. The System Settings (701 in FIG. 7)

The implementation can mandate and or recommend system settings for system parameters such as hardware pre-fetch policy or page size. The GPI run-time will change the settings to the mandated and recommended ones before commencing the execution of the GPI function and restore the settings to the original ones after completion of the execution. If the changes to the mandated setting are not possible because of limited privileges granted to the run-time, the implementation will not be considered for the function call. For example, in the system settings 701 in FIG. 7, we could have recommended that page size be set to 16M and that hardware pre-fetch be turned off, but have mandated that SMT mode be set to 4.

2. The System Resources Required (702 in FIG. 7)

As shown previously in the upper left corner of FIG. 6, the run-time can obtain values of available system resources via the 'Resource API' 602. Non-limiting examples of system resources might include: the number of cores available in the resource set, the sizes of the caches, amount of memory available, and availability of hardware accelerators. The metadata in each GPI graph analytics operator implementation includes acceptable limits for these resources. An implementation of a GPI operator is applicable to the operator call only if the level/quantity of these resources 702 as obtained from the 'Resource API' for the selected system is within the acceptable range defined in the metadata for the graph analytics operator call. Where applicable, for example in case of main memory in FIG. 7, the run-time can request additional resources from the OS to bring the resources levels within acceptable limits.

3. The Permissible Argument/Parameter Ranges (703 in FIG. 7)

The implementation of a GPI operator call can specify the permissible range for the operands. This is accomplished by specifying restrictions on the metadata values associated with the argument, as illustrated in bottom left corner in FIG. 7. In the example of this discussion, Matrix-Multiply-MM47 can be selected only if the second operand is a CSR Matrix with fewer than 64 million nodes and more than six non-zero entries per row on average.

Cost Models for Implementations of GPI Functions and Choosing the Applicable Implementation with Lowest Predicted Execution Time Returning to FIG. 6, the process of selecting the best implementation of a GPI operator, from all of the applicable implementations of that GPI operator identified in the previous step, is illustrated in schematic 600. Each implementation of a GPI operator is required to have a cost model which estimates the time taken by the implementation to execute the operator call on a selected machine. This estimate takes into account the metadata associated with the arguments of the function call, and the system settings and resources available. The metadata associated with the objects includes the size and representation of the objects. The lowest cost implementation among all selected machines is chosen from the set of applicable implementations.

The metadata passed to the run-time may not necessarily have all the attribute values needed to determine the applicability of some implementations or their costs, using the cost models provided. Hence the cost models also include the analyze functions for computing the attribute values of the arguments passed in GPI function calls.

Deployment of the Selected Implementation of a GPI Function to Achieve Lowest Execution Time FIG. 6 exemplarily describes the deployment process for the GPI function call GPI_mxm(C,A,B,g,h). The Graph Processing Interface 601 maps r1 to C, and maps a1 and a2 to A and B respectively. The operator f is GPI_mxm. F1, . . . , Fk are the various implementations of GPI_mxm, and it is assumed, for purpose of this discussion, that F1 is Matrix-Multiply-MM47. CF1, the cost of executing F1 is computed by:

1. Once the possible or candidate systems are identified as a preliminary step, determining the operand and result 'type-castings' needed based on the meta data associated with operands of A, B and C, and the 'Operand Parameters Envelope' metadata associated with the Matrix-Multiply-MM47. In our case operand A is to be cast from edge-list to CSR format and B has to be cast from dense representation of sparse matrix to CSRE format. For simplicity, it is assumed that the result r1 did not require type-casting.

2. Computing the time required to carry out the casts by calling the cost model for the required 'cast' functions with two parameters, the first is the metadata associated with the original form and transformed form of the argument (ai and Ai), and the second one is configuration and resources available from the 'Resource API'. If some of the metadata required as inputs by the cost model is not available and an analyze function is available to compute the metadata, the analyze function will be called to compute the metadata. In general these analyze functions will be sampling-based low cost implementations.

3. Compute the time required to execute MatrixMultiply-MM47 on the candidate systems previously identified by calling the cost model for MatrixMultiply-MM47 with two parameters, the metadata associated with the original form and transformed form of the argument (ai and Ai), and the configuration and resources available from the 'Resource API'.

4. The cost of performing GPI_mxm(C,A,B,g,h) using the Matrix-Multiply-MM47 implementation is then the sum of costs in items 2 and 3 above.

The cost of each applicable implementations of GPI_mxm (C,A,B,g,h) is computed using the above approach, and F and the implementation with minimum cost is selected by the Planning Module 605 for deployment to the execution module. The deployment of F to the Execution Module 606 consists of the following steps:

1. Supplying the parameters to F. These parameters consist of all the parameters of f plus an additional set of parameters B supplied by the cost model. For example, if Matrix-Multiply-MM47 is a blocked implementation, then the cost model provides the block size for which the cost of performing F is optimum (minimum time) in addition to the cost. More generally, the cost model for an implementation of GPI operator provides all the parameters required by the implementation, but not present in the GPI operator call.

2. Supplying all the cast functions.

Management of Metadata:

The run-time requires a minimum metadata to be associated with each graph, matrix or vector object. For example, for graphs matrices, their size and representation will be the minimum metadata. Both user applications and GPI operator implementation must create this minimum metadata as they instantiate objects manipulated by run-time.

Specific representations of objects, such as quad tree representation of graphs require a minimum representation specific metadata such as such as leaf-node structure and size. Similarly, the edge count is a required metadata for CSR representation. Here too, both user applications and GPI function implementation must create this minimum metadata as they instantiate objects manipulated by run-time.

Attributes, non-specific to any representation such as sparsity or number of non-zero entries per row, or specific to a representation such as number of leaf nodes in a quad tree, may not be supplied by the application. These attributes also change if the objects are mutated. Furthermore, manipulating these attributes is not the core concern of the application developer/user. While knowledge of these attributes may not be essential to performing a GPI function, it can be essential to selecting the optimal implementation of that function.

The planning module 605 can compute attributes of objects, if the value is not already known, using the analyze functions collocated with the cost functions in the cost model. The accuracy of these attribute values is not critical to the selection of proper implementation of a GPI function, and the gains from getting very high accuracy of these attributes will mostly be overshadowed by the cost of computing these attributes to the highest level of accuracy. Sampling methods will suffice most of the time. Scans of complexity linear in size of the object may be the other dominant category of analyze functions.

Exemplary points, variations, and additional comments of this first aspect of the present invention include the following.

1. A graph processing system is described that includes a Graph API of many operator calls to express computations of a graph analytics applications, a run time to perform the computations specified by each Graph API operator, and a conventional computing system, which includes: a library of multiple implementations for each of the Graph API functions, each implementation optimal for a specific set of conditions met by the graph being processed, the computing system functional capabilities on which the graph is being processed, and the resources available on that computing system; a mechanism to gather the functional capabilities of the computing system; a mechanism to determine the functional capabilities required in the computing system by the implementation of the GPI function; and a mechanism to select the preferred implementation of a Graph API function from the multiple implementations in the library for executing a Graph API function for the functional capabilities of the computing system.

2. The graph processing system can include functional capabilities which might include any or all of: Field Programmable Gate Arrays (FPGAs); Graphics Processing Units (GPUs); a cluster of nodes with shared memory or message passing capability; either or both of a cluster of nodes with NoSQL databases installed (Accumulo, HBAse, Neo4J, etc., are current examples, future ones may be different) and a cluster of nodes with Map/Reduce programming environment.

3. The selecting of the preferred implementation can include the evaluation of a cost function associated with each of the implementations of a Graph API operator that can be executed with available functional capabilities, and selecting the one with minimal cost. There is metadata associated with each implementation of a GPI operator, and the selection of the preferred implementation could include using the meta data associated with the implementation to ascertain whether the implementation of the GPI operator can be executed with available functional capabilities, evaluating a cost function for each of the implementations of a Graph API function that can be executed with available functional capabilities listed in the metadata and available from the system, and selecting the one with minimal cost.

4. In an exemplary embodiment, the graph processing system can include a Graph API of many function calls to express computations of a graph analytics applications, a run time to perform the computations specified by each Graph API function, and a conventional computing system, which includes a library of multiple implementations for each of the Graph API functions, each implementation optimal for a specific set of conditions met by the graph being processed, the computing system functional capabilities on which the graph is being processed, and the resources available on that computing system, a module to gather the amount of computational resources available from conventional computing systems, a module to extract functional resources required to execute an implementation of a GPI function from the metadata associated with the implementation of the GPI function, a module to gather a portion of attributes of the arguments in Graph API function from the metadata associated with the arguments of the Graph API function, and a module to select the preferred implementation of a Graph API function for the metadata attributes of its arguments from the multiple implementations in the library for executing a Graph API function for the computational resources available.

5. The metadata about the computational resources related to the exemplary embodiment can include the amount of memory in any level of the memory hierarchy, where the memory hierarchy includes first to last level of on-chip caches, off-chip caches, on-board and off-board memories, and flash storage.

6. The metadata associated with graphs can include the number of nodes in the graph, the number of edges, its diameter, clustering coefficient, etc., or any combination of these.

7. The metadata associated with a matrix or adjacency matrix of a graph can be its dimensions or sparsity or both, and the sparsity is represented as probability of a cell being zero, the number of non-zero entries per row.

8. The metadata associated with a matrix or adjacency matrix of a graph is its representation (Dense, CSR, CSC, Quad tree, edge lists, etc., are examples or representation).

9. The selecting of the preferred implementation can include any or all of selecting the implementations of a Graph API function that can be executed with available functional capabilities, and possibly then further down-selecting the implementations to those whose permissible argument range metadata encompasses the attributes in metadata of the Graph API function call argument, and evaluating a cost function for each of the selected implementations, and then selecting the one with minimal cost.

10. The module to gather the attributes of the arguments of Graph API function calls could further include the execution of analysis functions provided for each argument type in a select set of GPI function calls in the library of implementations of GPI functions.

11. The attribute values computed can be written back into the metadata associated with the arguments of the GPI function call.

12. The computation of the attribute values can be based on sampling methods and the number of samples chosen is based on accuracy needed in the attribute values to resolve the order of cost function results of the different implementations.

13. The graph processing systems can set conventional processing system parameters according to the metadata associated with the implementation of GPI functions where an unsuccessful attempt in setting the parameter results in dropping the implementation from consideration.

14. The cost can be a function of additional parameters of the implementation of the GPI function and where the parameters in the call to the implementation of a GPI function are the union of the parameters in the GPI functions and the additional parameters returned by the cost function (example—block size for a blocked dense matrix multiplication).

15. The system can additionally transform representation of the arguments in a GPI function call using cast functions provided for selected representations of GPI function argument representation and selecting the preferred implementation for a GPI function call can include selecting all implementations of the GPI function calls from the library of implementations that can execute the GPI function call with transformed representation of its arguments, and selecting the preferred implementation from this expanded set of GPI implementations.

16. The system can perform optimizations over a collection of primitive graph operations, an aspect to be described in more detail in the following section describing details and underlying principles of operation.

17. Attributes of the graph can be performance monitoring unit data captured by the library.

18. The selection of an implementation from the library can be a table look-up based on attributes of the graph and/or one of the classification or clustering methods known in the data mining discipline.

19. The condition upon which optimality is determined can be execution time, resource usage, or a combination of both.

20. A graph sparsity structure can be specified in an ontology, a graph-oriented representation of various types of information about the graph and the relationships between these information types.

21. This first aspect of the present invention can be considered to describe a method of performing graph computations by: specifying portions of the computations as a set of Graph performing graph computations by: specifying portions of the computations as a set of graph API operator calls; collecting a portion of the attributes of the graph from the graph API and the run-time; collecting the conditions of the computational system; making a selection of the library implementation for each primitive in the set that is optimal for the primitive, and then performing the operation on the selected computing system.

22. The selected computing system can be any of the many computing systems available to the run-time, including computing capabilities on the same computer executing the run-time. Furthermore, the run-time could select a different computing system, and, therefore, a different optimized implementation of the graph operator for that system, for each of the different graph operators in the application.

Section II: The API and Supporting Run-Time System

This second section explains more details underlying the API and supporting run-time system of an exemplary embodiment of the present invention and how this run-time system manages the objects, tracks the changing characteristics of objects and dynamically changes their representations to achieve better performance. It also explains how the run-time system further tracks the sequences of operations being performed and dynamically chooses the best routines to execute some combinations of the operators. The run-time system is capable of tailoring the object representations and methods on them, based on system and resource characteristics, that can be provided statically as parameters or dynamically gathered from the system.

The notions of Type and Object, which is an instance of a certain type, are well-known in the literature. The present invention uses these notions, but develops new ways of managing them to provide dynamic abilities to change their implementations and methods to automatically tune them for better efficiency based on observed characteristics of the graphs being processed.

Figure 8:
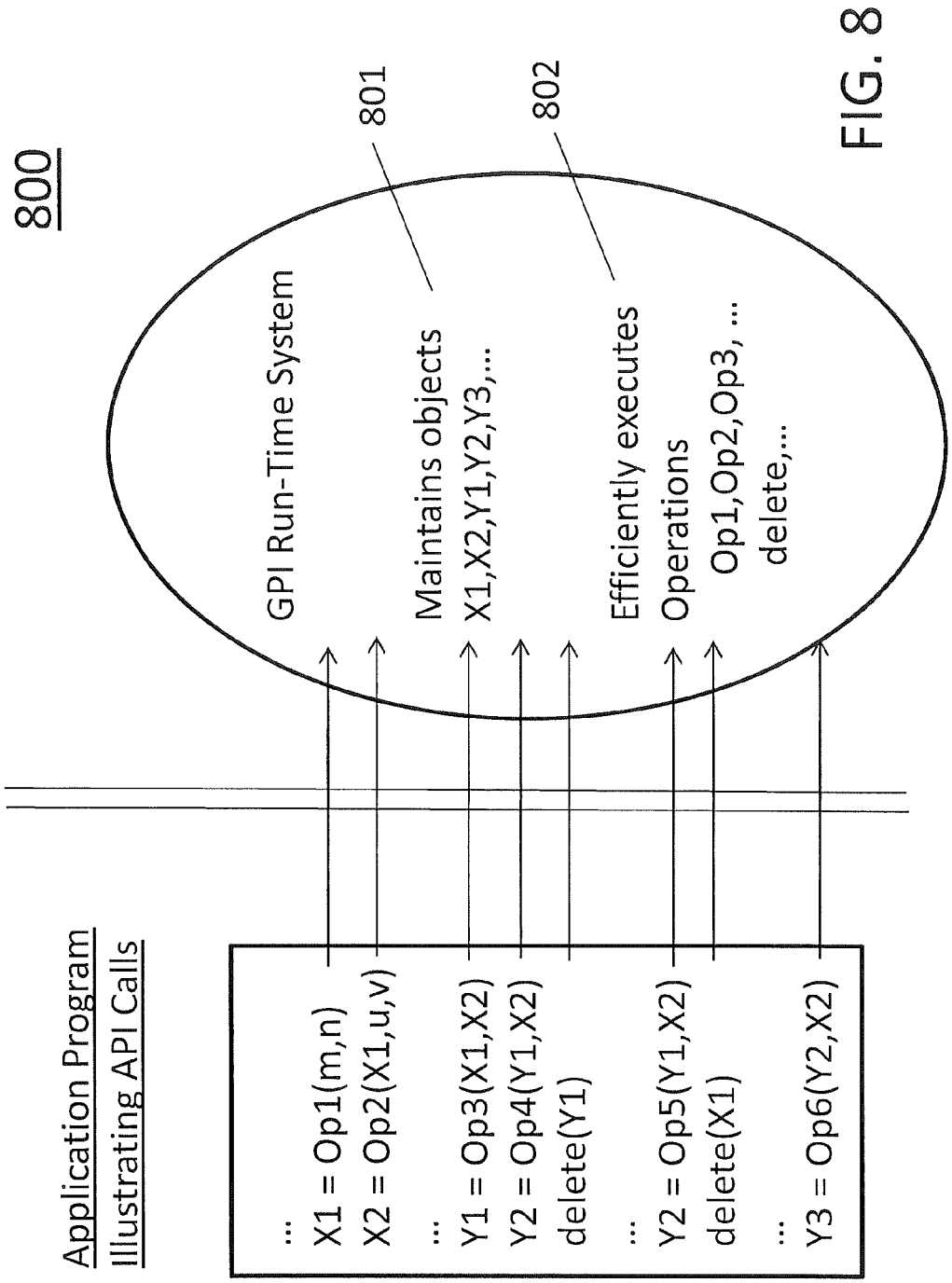
FIG. 8 exemplarily shows 800 an application program interfacing with the GPI run-time.

In this method, the types are partitioned into two categories: primitive and complex; A type is complex if it has a potential for either multiple representations or multiple methods of accessing its contents; otherwise the type is said to be primitive. Intuitively, application programs have direct access to the values of primitive types, whereas values of complex types cannot be directly accessed and must be manipulated by invoking the API primitives 801, 802 provided by the run-time system, as exemplarily depicted in FIG. 8.

The run-time system manages (creation, access, manipulation and destruction) of complex objects, so that changes can be dynamically made to their representations or to their access methods by the run-time system, without affecting the running of application programs. Below we describe one exemplary way of implementing such a system; we describe its data structures, its methods and functions used. We illustrate how each of various objects are implemented for sample programs.

Figure 9:
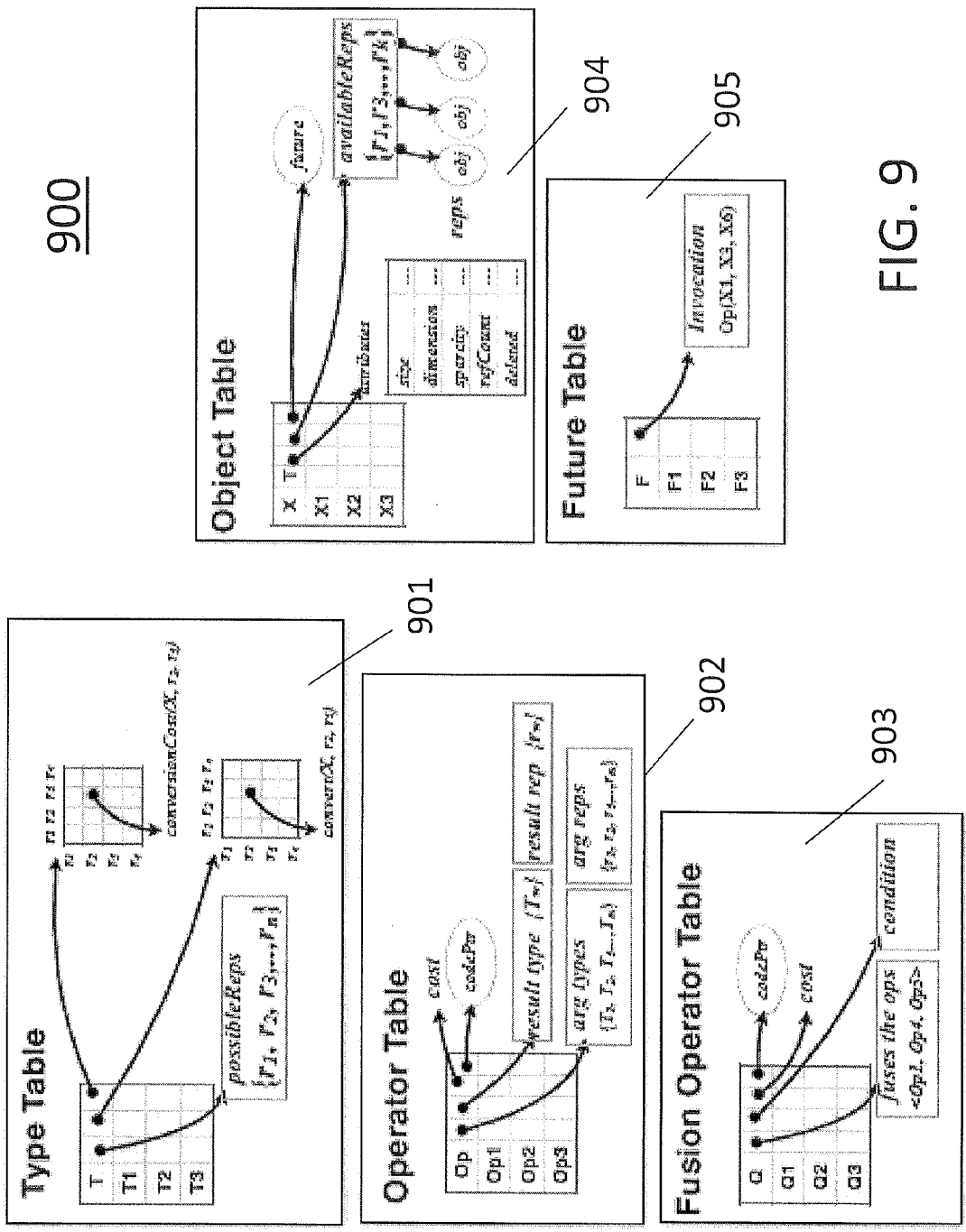
FIG. 9 shows the principal data structures 900 maintained by the run-time system.

The principal data structures 901, 902, 903, 904, 905 maintained by the run-time system are exemplarily shown in FIG. 9. The three tables 901, 902, 903 on the left contain static information about type, operators, and optimization-related techniques maintained by the run-time system, and the two tables 904, 905 on the right contain dynamic information about structures dynamically created and maintained during the execution of an application.

The type table 901 maintains information about all complex types, their possible representations, conversions between representations, and their costs. The object table 904 contains information about all (complex) objects, their types and their attributes. It has either a pointer to a future or to the representations of the object: the run-time system has the flexibility to postpone the computation of the contents of the object in which case it is remembered in a future table 905, which contains the actual invocation (opcode and arguments) to create that object. After it is computed, the future is deleted and the pointers to the various representations computed are noted there.

The operator table 902 lists all the run-time interface primitives, the types and representations of arguments expected by each primitive and their return types; it has a pointer to the routine that implements it and its associated cost. Note that a primitive may have different implementations (and costs) based on the representation it has.

Finally, the fusion operator table 903 lists sequences of operators, which can be implemented by a single routine more efficiently than executing the individual primitives one after the other. However, in order to exercise this option, the routine may impose some conditions on the attributes of the arguments of the primitives (e.g., certain arguments are sparse, etc.). The condition is noted in the table, as an expression involving the attributes of the operands. If the condition is satisfied, then the sequence of operators can be more efficiently executed by this routine.

The Static Data Structures (901, 902, 903)

The following data structures are used to maintain static information about the types and operators supported by the run-time system. They are updated as the run-time system is revised to support new types, new operators and new optimization techniques.

1. possibleReps: is an array indexed by a type from a set of types T; possibleReps[T]=the set of possible representations for an object of type T 2. operators: is an array of records one for each operator; the record, P, for an operator contains:

P.op: gives the name of the operator function

P.argTypes and P.argReps: the sequence of argument types and representations P.argTypes[i], P.argReps[i] give the type and rep of $i^{th}$ argument P.returnType, P.resultRep: the type/rep of result returned by this operator P.cost: is the cost of this operation P.codePtr: is the pointer to the code of this operation 3. fusionOperators: is an array of records one for each fusion operator; the record, Q, for a fusion operator contains:

Q.op: is a sequence of operators, P1, P2, . . . , Pk

Q.condition: is a boolean expression in terms of the attributes of the argument objects of the sequence of operators, P1, P2, . . . , Pk Q.cost: is the cost of performing the fused operation by this routine Q.codePtr: is the pointer to the code of this operation. This routine executes the given sequence of operators more efficiently than executing them one after the other, provided the arguments satisfy the specified condition.

The Dynamic Data Structures (904, 905)

The following data structures are used to maintain information about the objects that are dynamically created during the execution of an application, as exemplarily demonstrated in the Object Table 904 and the Future Table 905 in FIG. 9.

1. invocation: is a record, I, used to invoke the run-time system, where

I.op: gives the name of the operator being invoked

I.argObjects: is the sequence of argument objects supplied for that operator I.argObjects[i] is the $i^{th}$ argument object and its type must match the corresponding argType of the operator, i.e. I.argObjects[i].type=P.argType[i], where P=operators[I.op]

notation: an argument i is said to be a future argument if I.argObjects[i].future≠φ

2. objects: is an array of records one for each object; the record, X, for an object contains:
X.type: gives the type T of the object
X.attr[A] is an array of values, indexed by attributes from the set A; A=[size, dimensions, sparsity, reference-Count, deleted, etc.]
either a future or reps as shown below:
X.availableReps ⊆ possibleReps[X.type] and X.rep[ri]: the set of representations and their pointers currently available for the object
X.future is a pointer to a future structure, that will compute the object later 3. futures: is an array of invocation records one for each future the record, F, for a future contains
F.invocation: is the invocation record I that must be evaluated in the future
F.object: is the object X (which points to F) to which the result will be assigned Functions The run-time system has the following general utility functions to manipulate the above data structures. Some of them operate only on the static structures, while others use both structures. These functions are defined for convenience to concisely describe the operation of the run-time system.

1. convert(X, ri, r3): This function takes the object X and a representation ri∈X.availableReps; it makes a copy of the object from representation ri into r3 and adds it to X and updates its availableReps.

2. conversionCost(X, ri, r3): This function returns the cost of the function convert(X, ri, r3).

3. coercionCost(X,r): This function validates that r∈possible Re ps(X,type) and returns the minimum cost of getting the object X into representation r:

$$\text{return} \min_{r' \in X\text{-available Re ps}} conversionCost(X, r', r)$$

4. costByOperator(P, I): This function returns the minimum cost of executing the invocation I using the operator P. Basically, this is the cost of converting all arguments into the representation required by the operator plus the cost of the operator.

If P.op ≠ I.op, return infinity;

$$\text{else return } P.cost + \sum_{all\,args\,i} \{conversionCost(I.argObjects[i], P.argType[i])\}$$

5. bestOperator(I): This function returns the best operator for executing the invocation I;
return argmin (over all operators P) {costByOperator(P, I)}

6. getFutureSeq(Fset): Given a set of futures Fset, this routine collects all futures needed to evaluate the futures in Fset, and returns them in an order so that they can be evaluated one after the other: It executes the following pseudo code:
Let S=(Fset);
Repeat
if (there exists F' in S, |F" is a future argument of F' and F"∉S) then S=S∪U{F"}
until no more can be added;
sort S so that each future can be evaluated using the results of the preceding futures in this sequence
return S 7. getFusedSeq(S): Given a sequence of futures S, this routine searches the fusion operator array and finds subsequences that match Q.op, for some fusion operator, Q, and if Q.condition is satisfied, replace the subsequence with Q. It repeats this process until no further change occurs and returns the final sequence.

8. addReps(X): Given an object, X, based on its attributes and available representations, this routine determines any desirable additional representations that should be computed for this object and computes them and adds to the record of this object.

9. evaluate(F): This routine is called when the future F has no future arguments and hence is ready to be evaluated. This routine evaluates it and transfers the result to the object pointed by the future and deletes the future F.

Figure 10:
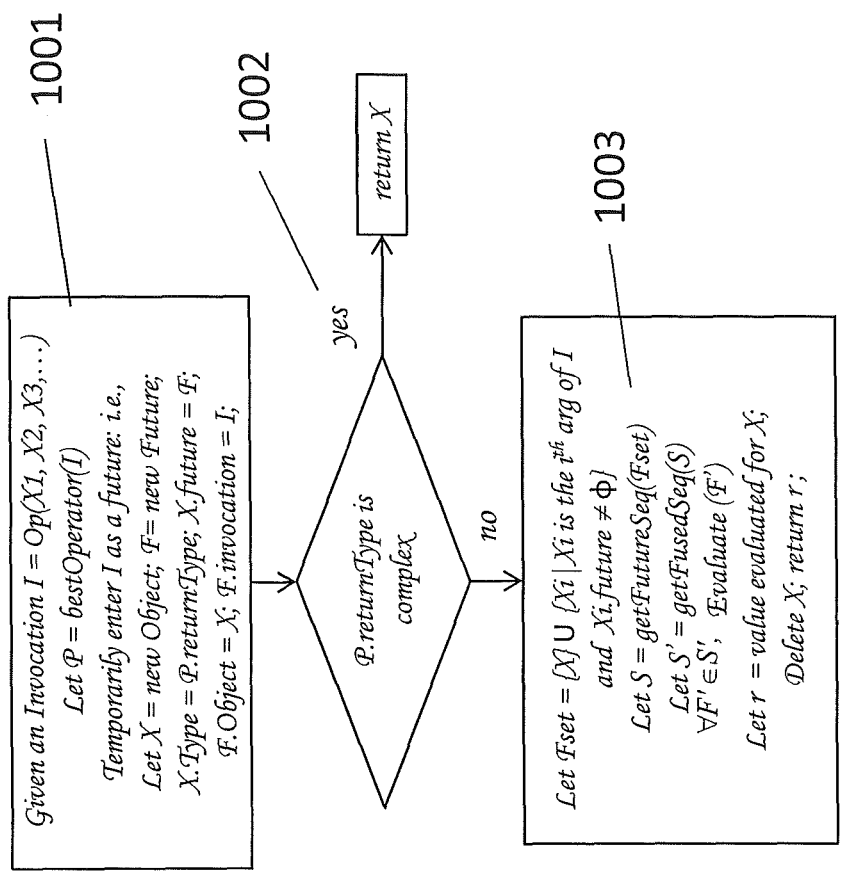
FIG. 10 shows in flowchart format 1000 an execution of the GPI-primitive.

Let X=F.object, I=F.invocation and assert that I has no future arguments Let P=bestOperator(I);
Execute the routine P.codePtr supplying the arguments from I
Set X. rep to point to the result
Add any desired reps by invoking the routine addReps(X)
Reset X.future=null; Deallocate future F Execution When a primitive is invoked, the run-time system executes the algorithm shown in the flow chart 1000 of FIG. 10. In step 1001, the run-time system examines all the operators in its repertoire that implements the requested operation, and selects the operator that has the minimum cost, based on the current representation of the arguments and the representations demanded by each implementation routine.

If the return type is complex, step 1002, it simply creates a new future, records all necessary information in it, and returns a handle to a new object, which is noted to be computed in the future. If not, in step 1003, it examines if any of its operands are futures; If so, it collects all the futures needed for its computation (recursively, as some futures may need other futures as their arguments). Then, it examines the sequence of futures and identifies any subsequences in them that could be fused together to be executed by an available routine that is more efficient. It executes all selected futures, most efficiently. Finally it evaluates the invoked operation and returns the result.

Reference Counts and Deallocation

Objects, X, inside the run-time system maintain a reference count, X.refCount, which is the number of futures currently in the system, whose evaluation requires X as an argument. This is incremented, each time a future is created, with an invocation, having X as an argument. It is decremented, whenever a future, having X as an argument, is evaluated. An object, X, also has a field, X.deleted which is set when the application program invokes delete. The run-time system deallocates the object when it is marked as deleted AND its reference count is zero. Use of objects by an application, after having deleted, is easily detected using this information.

Illustrations

Data Types

Here we consider the example of T=[vector, matrix], with the following representations: (see FIG. 11)
possibleReps[vector]={dense,bmv,mbmv,hashed}
dense is the normal representation of vector using a full array (1101)
bmv is a vector with an additional bit vector mask indicating non-zero entries (1102)
mbmv is a vector with a hierarchy of bit vector masks, to handle multiple granularities (1103)

hashed is a method of tracking non-zero entries using hashing possibleReps[matrix]={csr,csc,blockedCsr, blockedCsc,qtree} csr is the compressed sparse row form (1104)

csc is the compressed sparse column form (1105)

blockedCsr is the blocked csr form blockedCsc is the blocked csc form qtree is the quad tree representation of matrices, to compactly store non-zero entries Attributes We use the following attributes in the examples below: Let V be a vector of size n, and let M, be a matrix of size n×n. Let nz(V)) and nz(M) denote the number of non-zero entries in them. Then $sp(V)=(1-nz(V)/n)$ denotes the sparsity of the vector V. We use the symbol, $d=nz(M)/n$ to denote the average number of non-zero entries in a row of matrix, M.

Operators

A set of basic functions and higher order functions are used to manipulate graph properties. A sample of them are listed below:

a. replicate(x) returns a vector whose elements are all set to value x b. indices( ) returns a vector of natural numbers 1 through the dimension of the vector.

c. filter(x, u, v) returns vector, w, where $w[i]=((u[i]=x)?v[i]:x)$ d. zip(f, u, v) returns vector, w, where $\forall i, w[i]=f(u[i], v[i])$ e. map(f, u) returns vector, w, where $\forall i, w[i]=f(u[i]$ f. reduce(f, x, u) returns $y_n$, where $y1=f(x, u[1])$, and $yi=f(yi-1, u[i]), \forall i=2 \ldots n$ g. mTimesV(f, g, x, M, u) returns vector, v, where $v[i]=reduce(f, x, zip(M[i], u)), \forall i$ Choice of Representations As the sparsity of a vector increases, the bmv, mbmv representations are preferred and as the sparsity of a matrix increases, the csr, csc representations are preferred. As these structures are created, the addReps routine will evaluate the sparsity attribute and add the more efficient representations to the structure. For matrices, usually both csr and csc representations are maintained to facilitate operations on both the matrix and its transpose. The vector x matrix operation, illustrates the choice of csr or csc representation for the matrix.

Consider a vector V of size n being multiplied with a matrix M of size n×n. Choosing the number of operations executed as a measure of efficiency, the run-time system can dynamically change between these representations. The codes 1200 for doing the operation, when M is CSR (i.e., 1201) and CSC (i.e., 1202) forms, are shown in FIG. 12, and each line is annotated with an estimate of the operations involved.

We get the ratio, $opcount(CSR)/opcount(CSC)=(2+(2+4d)(1-sp(V)))/(3+3d)$. As the sparsity of V, sp(V), increases from 0 to 1, the ratio decreases from $(4+4d)/(3+3d)$ to $(2/(3+3d)$, favoring CSC representation initially and then favoring CSR later on. Thus, the run-time system can set these costs for the operations with respective representations expected for the arguments and our algorithm will automatically choose the right routines to execute the operation efficiently.

Fusing Operations

To illustrate how fusing of operations can be efficiently chosen, we look at the example of the following sequence of operations in the BFS program: t=q*M; r=filter(p, t), where q is a vector of size n denoting (using 0 or 1) the nodes at a level of the BFS algorithm, p is a similar vector denoting all the nodes visited so far, and M is the n×n adjacency matrix. From BFS algorithm we know that sp(p) gradually decreases and sp(q) is high at the beginning and end, and decreases in the middle.

First consider doing the two operations one after the other. The first operation is vector x matrix, and using the code given in the left side 1301 of FIG. 12, for the CSR form of the matrix, we get the total operation count of $n(2+(2+4d)*(1-sp(q)))$. The code for the filter operation is shown on the left of FIG. 13 (i.e., 1301); the operation counts, as marked in the margins, total up to $n(3+sp(p))$; Together the two routines take a total of $n(5+sp(p)+(2+4d)*(1-sp(q)))$ operations.

At the right (i.e., 1302) of FIG. 13, we show the code to do the two operations together, using the CSC form for the matrix. We get a total operation count of $n(3+(2+3d)*sp(p))$. Comparing the two, we get the ratio (fused/separate) as, $(3+(2+3d)*sp(p))/(5+sp(p)+(2+4d)*(1-sp(q)))$. Simplifying we get, that the fusion operation is more efficient, if and only if $(1+3d)*sp(p)>(2+(2+4d)*(1-sp(q)))$. The run-time system can create this fusion operation, (named as Q) and set the condition Q.condition to this expression.

Other Uses of the Apparatus

We have illustrated here how the proposed system can implement dynamic changes to simple vector/matrix representations and to the methods used to execute the operations. The same apparatus can be used to handle more complex structures such as quad tree implementations of sparse matrices, matrix algorithms that employ tiling and blocking, etc., all of which can be adjusted based on observed system and graph characteristics. Similar adjustments can also be made based on the system characteristics of available devices. In summary, the apparatus is powerful to incorporate any dynamic changes for efficiency without changing the top-level software and without the application writer having to be concerned about the changes.

Exemplary points and variations of the Graph Processing System detailed in this second aspect of the present invention include:

1. A graph API of primitives creates graphs and executes graph analytic applications upon the graphs, the graph primitives supporting the creation and manipulation of multi-dimensional properties of graphs, where a one-dimensional graph property being a mapping assigning each node a value for that property, (intuitively a vector), a two-dimensional graph property being a mapping assigning each node a one-dimensional graph property, as a value for that property, (intuitively a matrix), and so on. A run-time library implements the primitives in an efficient manner, with abilities to dynamically adjust a variety of representations and algorithms to efficiently execute sequences of operations on the graphs. A specification, from conventional languages such as C, C++, Python etc., of calling signatures is used for the primitives to be called, so that top level-algorithms can be easily coded in any of these languages by invoking the corresponding libraries. Algorithms written to this graph API are portable across multiple implementations.

2. A run-time library is described that includes and/or takes into account the following capabilities:

recognizes two kinds of characteristics or metadata:

System characteristics, such as, devices and configurations, (e.g., GPUs, FPGAs, special purpose graph processing engines), distributed resources (memory, processors, network), memory hierarchy, cache sizes, optimal block sizes for large data, frequency and utilization characteristics of certain devices and data, etc.; and Graph characteristics, such as, the number of nodes, edges, degrees, sparsity of graph properties, access tendencies such as read-only, update, reuse, etc.;

is able to gain the knowledge of both of the above characteristics, either by taking as parameters at configuration time or by gathering them dynamically, by querying the system and by observing properties through monitoring and maintaining history etc.;

is able to choose suitable data structures to represent the graph properties, including linked lists, compressed vectors, CSR, CSC, sparse matrices, quad-trees, etc.;

is able to preserve the semantics of the primitives, while changing the representations dynamically;

is able to implement large graphs using shared memory or distributed memory and shielding the top-level primitives from the underlying implementation; and is able to utilize a variety of hardware units such as GPUs, FPGAs, special purpose graph processing engines as well as conventional processors with caches and threading capabilities, without having to change the top-level algorithms.

3. A run-time system is described in which the representation for an object is chosen and changed dynamically based on the metadata gathered as capable of gaining the knowledge of both system characteristics and graph characteristics, as described above, either by taking as parameters at configuration time or by gathering them dynamically, by querying the system and by observing properties through monitoring and maintaining history, etc.

4. A run-time system is described in which sequences of operators are executed in a lazy fashion, so that an optimal order of execution is chosen dynamically based on the metadata gathered as capable of gaining the knowledge of both system characteristics and graph characteristics, as described above, either by taking as parameters at configuration time or by gathering them dynamically, by querying the system and by observing properties through monitoring and maintaining history, etc.

5. A run-time system is described which maintains different routines to optimally execute different combinations of operators (called fusion of operators) and invokes the optimal routine(s) for a given sequence of operators is chosen dynamically based on the metadata gathered as capable of gaining the knowledge of both system characteristics and graph characteristics, as described above, either by taking as parameters at configuration time or by gathering them dynamically, by querying the system and by observing properties through monitoring and maintaining history, etc.

6. A run-time system is described which schedules parallel sub-computations in an application, efficiently based on the metadata gathered as capable of gaining the knowledge of both system characteristics and graph characteristics, as described above, either by taking as parameters at configuration time or by gathering them dynamically, by querying the system and by observing properties through monitoring and maintaining history, etc., without having to change the top-level algorithms.

Section III: Hybrid Node Quad Tree

This third section describes yet another aspect of the present invention in which the conventional quad tree format can be modified for more efficient operation of a graph analytics application, based upon characteristics of the graph data, as explained herein.

Quad trees provide an efficient data storage structure for performing a variety of linear algebra operations on graphs sparse matrices. The state of the art is to represent each non zero entry of the quad tree as a leaf node.

While the above approach eliminates the arithmetic operations performed on zero valued arguments, it entails access overhead in fetching the zero valued arguments.

Performance of linear algebra operations on sparse matrices can be expedited if we chose the leaf node of the quad tree to be blocks of the sparse matrix rather than its individual elements. The block size is chosen, individually for each block such that making it any smaller increases the access overhead more than the reduction in time taken by the arithmetic operations, and making it any larger increase the time taken by arithmetic operations more than the reduction in access overhead.

Once the leaf nodes in the quad tree are matrix blocks in themselves of non-uniform sizes, the representation of the matrix in these leaf nodes need not be uniform either.

1. When the sparsity is very low, i.e., only a few zero entries, one is better of representing the matrix in the leaf node as dense matrix. The overhead of few extra arithmetic operations is far less than the time saved in accessing the matrix now represented as a two dimensional array. Addresses of the elements being accessed can now be computed arithmetically from a few variables in a modern processors register set or cache, rather than requiring indirection which takes a trip to memory.

2. Where the sparsity is extremely low, i.e., only a small fraction of rows or columns have non-zero entries, keeping the entries as edge lists will give better performance. Such matrix blocks are not combinable with their buddies in a quad tree because the buddy may be dense. Furthermore, depending on the set of operations to be performed on the edge lists, and the size of edge lists, we may chose the edge lists to be sorted in row order, or column order, or both with either row or column being the top level.

3. When the sparsity is of the order of only a few elements per row or per column, then representations like Compressed Storage By Row (CSR) or Compressed Storage By Column (CSC) are preferred for matrices that are not changing, for example, adjacency matrices of static graphs. For dynamic graphs, one might use a combination of heaps and linked list to perform the matrix operations efficiently.

The performance of sparse matrix operations on a block of the matrix is not only a function of the block size and its representation, it is also a function of the system capabilities and resource levels, such as the availability of flash memory on the node and its size. These system capabilities and resource levels can be inputs for the decision process in choosing the representation of a block in quad tree representation as well as in other representation.

Furthermore, each block can be associated with metadata about the sparsity structure or attributes of the block, in the same way as we associated metadata with matrices in the earlier discussion. Different implementations of sparse matrix operation can exist at the block level as well, each optimal for some range (or subset of values) of sparsity attributes. The sparse matrix operation can be carried out by selecting the optimal implementation for each block.

The above method of choosing different representation of blocks and different implementation of the sparse matrix operation can also be used for blocked representation of matrices other than quad tree. For example, we can have a dense representation of a matrix in which each element of the dense representation is a sparse block of some size. However, in this case, in order to maintain access efficiency, the block sizes will be uniform.

Exemplary points and variations of this third aspect of the present invention include:

1. A quad tree representation for sparse matrices is described, where the leaf nodes of the quad tree are sub-matrices of different block size, the block size being chosen to optimize the time to perform basic liner algebra operations using: a. Sparsity of the matrix, and b. Number of entries in the block 2. A representation of a matrix as matrix of blocks is described, where the representation each block is chosen independently to optimize the time to perform basic liner algebra operations on it, the representation being chosen based on
   a. Sparsity of the matrix;
   b. Number of entries in the block;
   c. A set of specified liner algebra operations; and
   d. The relative efficiency of the system performing the set of linear algebra operations on each of the potential representations on matrices of the size of the block, and of given sparsity.

3. A system for performing linear algebra operations on blocked representation of sparse matrices is described, in which
   a. Different implementations exist for each sparse matrix operation
   b. Each block of the blocked representation is dynamically (and lazily) associated with an optimal implementation of sparse matrix operation based on the sparsity attributes of the block and system capabilities and resource levels.

4. A method is described of performing a specified set of linear algebra operations on sparse matrices where the representation of the matrix is quad trees as specified in claims 1, 2, or 3 above.

5. A method is described for performing operations on graphs by representing the graph as an adjacency matrix, and the graph operation as a composition of linear algebra operations, and representing the graph as the quad tree specified in 1, 2, or 3 above.

Section IV: Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 14:
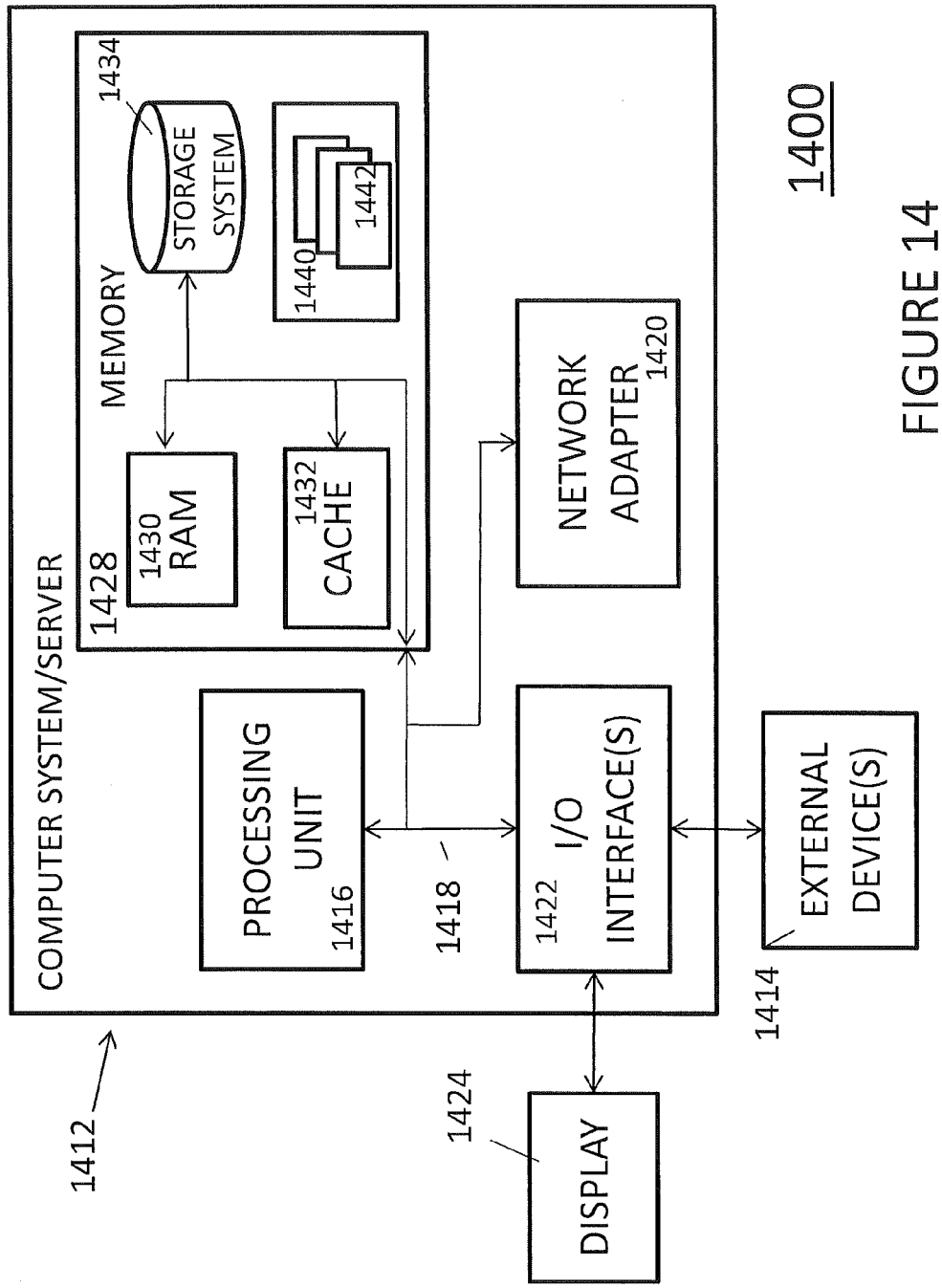
FIG. 14 depicts a cloud computing node according to an embodiment of the present invention.

Referring now to FIG. 14, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 15:
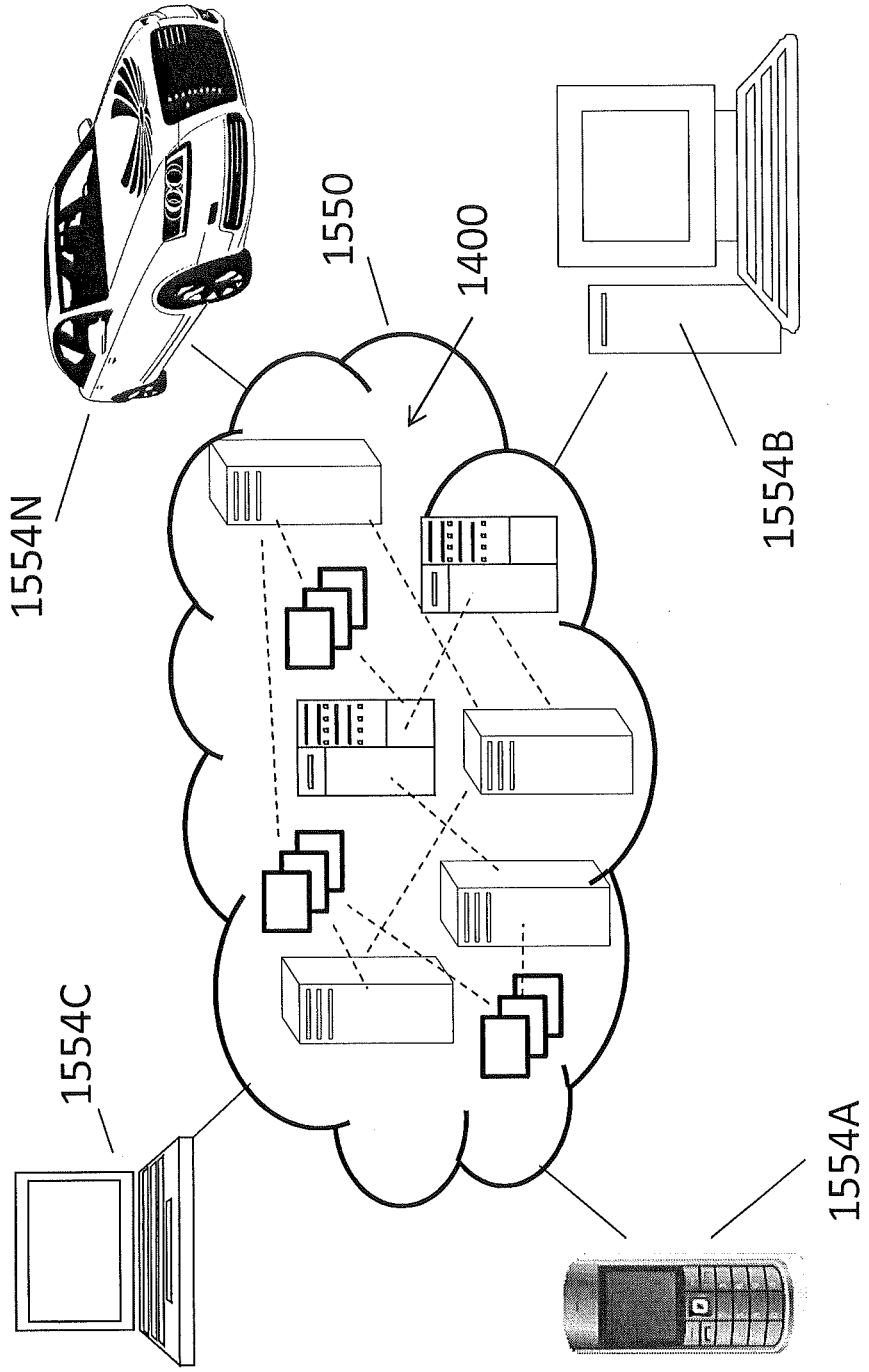
FIG. 15 depicts a cloud computing environment according to an embodiment of the present invention.

Referring now to FIG. 15, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1400 and cloud computing environment 1550 can communicate with any type of computerized device over any type of network and/or network addressable connection (e.g., using a web browser).

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of the graph analytical tool described here.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A graph processing system, comprising:
    a graph API (Application Program Interface), as executed on a processor of a computer and as capable of implementing any of a plurality of graph operators to express computations of input graph analytics applications;
    a run-time system, executed by the processor, to implement graph operators specified by each graph API function and to deploy the implemented graph operators to a selected computing system;
    a library of multiple implementations for each graph API function, each implementation predetermined as being optimal for a specific set of conditions met by a graph being processed, for functional capabilities of a specific computing system on which the graph is being processed, and for resources available on that specific computing system; and
    communication port to permit the run-time system to gather functional capabilities of different potential computing systems to execute the specified computations,
    wherein the run-time system determines functional capabilities required by an implementation of a graph API function to be executed in a selected computing system, selects a preferred implementation of a graph API function from the multiple implementations in the library for executing a graph API function with the functional capabilities of the computing system, and determines an optimal machine to execute the preferred graph API function implementation as based on having obtaining functional capabilities of different computing systems accessible through the communication port.

2. The graph processing system of claim 1, wherein the graph API and the run-time module operate on a run-time platform on top of an operating system on the computer.

3. The graph processing system of claim 1, wherein the selected computing system executing the deployed implemented graph API function comprises a computing capability on a same computer as executing the API and the run-time system, the computing capability executing the deployed implemented graph API using a different processor and a different operating system from that executing the graph API and run-time system.

4. The graph processing system of claim 1, wherein the graph processing system is executed on a first computer in a network interconnecting a plurality of computers, and the deployed implemented computations are executed on a different computing system on a second computer in the network different from the first computer.

5. The graph processing system of claim 1, wherein the functional capabilities of the computing systems comprise one or more out of:
    Field Programmable Gate Arrays (FPGAs);
    Graphics Processing Units (GPUs);
    a cluster of nodes with shared memory or message passing capability;
    a cluster of nodes with NoSQL databases installed; and
    a cluster of nodes with a Map/Reduce programming environment.

6. The graph processing system of claim 1, wherein the selecting of the preferred implementation comprises:
    evaluating a cost function associated with each implementation of a graph API function that can be executed with available functional capabilities of a selected computing system; and
    selecting an implementation of graph API function having a minimal cost.

7. The graph processing system of claim 1, wherein the run-time system implements a type-casting process to convert a data format of an input graph analytics application into another data format as necessary for a selected graph API and a selected computing system.

8. A graph processing system, comprising:
    a graph API (Application Program Interface), as executed on a processor of a computer and as capable of implementing any of a plurality of graph operators to express computations of input graph analytics applications;
    a run-time system, executed by the processor, to implement graph operators specified by each graph API function and to deploy the implemented graph operators to a selected computing system; and a library of multiple implementations for each graph API function, each implementation predetermined as being optimal for a specific set of conditions met by a graph being processed, for functional capabilities of a specific computing system on which the graph is being processed, and for resources available on that specific computing system, wherein each said graph API function implementation is associated with metadata wherein said selecting the preferred implementation comprises:
- using meta data associated with the implementation to ascertain whether the implementation of the graph API function can be executed with available functional capabilities;
- evaluating a cost function for each of the implementations of a graph API function that can be executed with available functional capabilities listed in the metadata and available from the system; and
- selecting a graph API with a minimal cost.

9. A graph processing system, comprising:
a graph API (Application Program Interface), as executed on a processor of a computer and as capable of implementing any of a plurality of graph operators to express computations of input graph analytics applications;

a run-time system, executed by the processor, to implement graph operators specified by each graph API function and to deploy the implemented graph operators to a selected computing system; and a library of multiple implementations for each graph API function, each implementation predetermined as being optimal for a specific set of conditions met by a graph being processed, for functional capabilities of a specific computing system on which the graph is being processed, and for resources available on that specific computing system, wherein the run-time system and graph API provides a platform to input and implement a graph analytic application program from a user by way of a graph processing interface (GPI) such that the graph analytic application program is executed using a coding predetermined as optimal and which is portable across different programming languages and computer platforms and such that the user is shielded from details of optimizations for execution of the input graph analytic application program.

* * * * *